United States Patent [19]

Mombo-Caristan

[11] Patent Number: 5,591,360

[45] Date of Patent: Jan. 7, 1997

[54] METHOD OF BUTT WELDING

[75] Inventor: Jean C. Mombo-Caristan, Troy, Mich.

[73] Assignee: The Twentyfirst Century Corporation, Troy, Mich.

[21] Appl. No.: 420,654

[22] Filed: Apr. 12, 1995

[51] Int. Cl.$^6$ .................................................. B23K 26/02
[52] U.S. Cl. ............................... 219/121.64; 219/121.78
[58] Field of Search .................... 219/121.63, 121.64, 219/121.78, 121.85

[56] References Cited

U.S. PATENT DOCUMENTS

| | | | |
|---|---|---|---|
| 3,019,327 | 1/1962 | Engel . | |
| 3,159,419 | 12/1964 | Kerby | 296/28 |
| 3,874,736 | 4/1975 | Anderson et al. | 309/63 R |
| 3,944,781 | 3/1976 | Urbanic et al. | 219/74 |
| 4,650,954 | 3/1987 | Frings et al. | 219/121 LD |
| 4,656,332 | 4/1987 | Gross et al. | 219/121 LD |
| 4,769,522 | 9/1988 | Lentz et al. | 219/121.63 |
| 4,827,100 | 5/1989 | Frings et al. | 219/121.64 |
| 4,872,940 | 10/1989 | Strum et al. | 156/379.8 |
| 4,902,872 | 2/1990 | Frings et al. | 219/121.63 |
| 4,945,202 | 7/1990 | Budenbender | 219/121.63 |
| 5,155,323 | 10/1992 | Macken | 219/121.64 |
| 5,245,156 | 9/1993 | Kamogawa et al. | 219/121.63 |
| 5,250,783 | 10/1993 | Nishi et al. | 219/121.64 |
| 5,393,956 | 2/1995 | Guth et al. | 219/121.64 |

FOREIGN PATENT DOCUMENTS

| | | | |
|---|---|---|---|
| 58-173095 | 10/1983 | Japan . | |
| 593757 | 12/1977 | Switzerland . | |
| WO94/08750 | 10/1993 | WIPO | B23K 26/06 |

OTHER PUBLICATIONS

Belforte, Levitt, *The Industrial Laser Annual Handbook 1986 Edition*, pp. 16–20; 69–70; 116.

Belforte, Levitt, *The Industrial Laser Annual Handbook 1992–1993 Edition*, pp. 39–41; 67–69.

Bagger, et al., *Process Behaviour during High Power $CO_2$ Laser Welding of Zinc Coated Steel*, Proceedings of LAMP, Jun. 1992, pp. 553–557.

Shannon et al., *Investigation of Keyhole and Melt Pool Dynamics During Laser Butt Welding of Sheet Steel Using a High Speed Camera;* ICALEO 1992, pp. 130–138.

*Weld Specifications Laser Welds–Butt Joints*, General Motors Engineering Standards GM4485M, Oct. 1992, pp. 1–4.

C. J. Dawes, *Laser welding of sheet metal fabrications–Process improvements*, ICALEO, 1985, pp. 73–80.

(List continued on next page.)

Primary Examiner—Teresa J. Walberg
Assistant Examiner—J. Pelham
Attorney, Agent, or Firm—Nilles & Nilles, S.C.

[57] ABSTRACT

A method of welding using a high energy density radiation beam for butt welding a pair of sheets while minimizing and preferably eliminating edge preparation required before welding and the use of filler metal during welding. In preparation for welding, the sheets are placed with edges facing each other in a butt-joint arrangement. To minimize and preferably eliminate edge preparation, surface mismatch is introduced between the sheets with a portion of the edge of the mismatched sheet being above the weld interface of the sheets and preferably exposed to the beam during welding. To further assist flow of molten metal from the mismatched sheet into the weld interface region, the sheets are preferably angled from the horizontal such that the weld interface plane is acutely angled relative to the direction of gravity so that flow of molten sheet material is influenced by gravity. Preferably, the sheets can also be inclined relative to the horizontal plane such that the weld line between the sheets is at least slightly downwardly sloped in the direction of welding so that the molten weld nugget in the weld interface region is influenced by the direction of gravity for suitably minimizing concavities and other weld defects in the resultant butt weld. If desired, the sheets can be angled both in a direction transverse and tangent to the welding direction. After welding is completed, the sheets preferably form a blank that can be shaped, formed, or otherwise three dimensionally contoured.

52 Claims, 7 Drawing Sheets

OTHER PUBLICATIONS

*Rofin Sinar Laser* brochure, Jan. 1993.

*Laser Ecosse* brochure, Feb. 1992.

Simon L. Engel, *Tooling Up For Laser Welding*, Society of Manufacturing Engineers, 1976, 6 pgs.

Mombo–Caristan et al., *Tailored welded blanks: A new alternative in automobile body design,* The Industrial Laser Handbook, 1992–1993 edition, pp. 89–102.

Mombo–Caristan et al., *Seam Geometry Monitoring for Tailored Welded Blanks,* ICALEO 1992, pp. 123–132.

Mombo–Caristan et al., *Process Controls for Laser Blank Welding,* Automotive Laser Applications Workshop '93, Ann Arbor, Michigan, Mar. 8 and 9, 1993, 7 pgs.

Chad Kymal, *Laser welding in high production,* ICALEO 1983, pp. 90–96.

Kim et al., *Laser welding of electrical sheet steel,* ICALEO 1985, pp. 59–63.

S. Llewellyn, *Laser welding of high–speed roll formed products,* Lasers in Manufacturing, 1987, pp. 297–301.

Shinmi et al., *Laser welding and its applications for steel making process,* ICALEO 1985, pp. 65–72.

Dawes et al., $CO_2$ *Laser welding of Deep Drawing Steel Sheet and Microalloyed Steel Plate,* ICALEO, 1983, pp. 73–79.

Hinrichs et al., *Production Electron Beam Welding of Automotive Frame Components,* Welding Journal, Aug. 1974, pp. 488–493.

Baardsen et al., *High Speed Welding of Sheet Steel with a $CO_2$ Laser,* Welding Journal, Apr. 1973, pp. 227–229.

ASM Committee on Laser Beam Welding, *Laser Beam Welding,* Special Welding Processes, pp. 647–671.

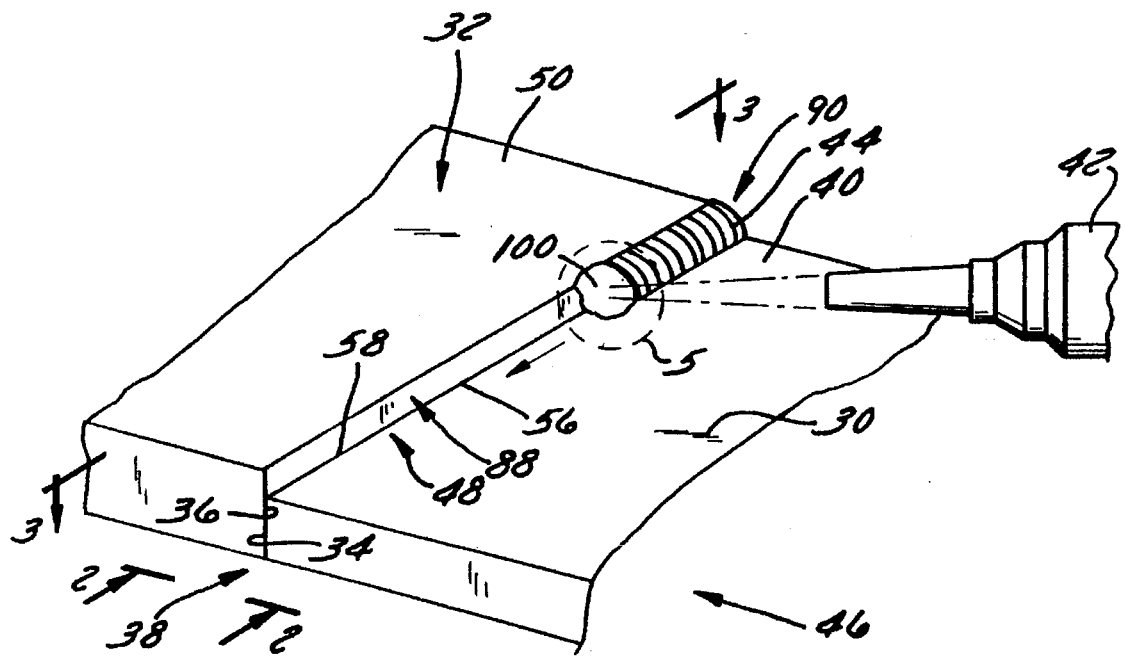
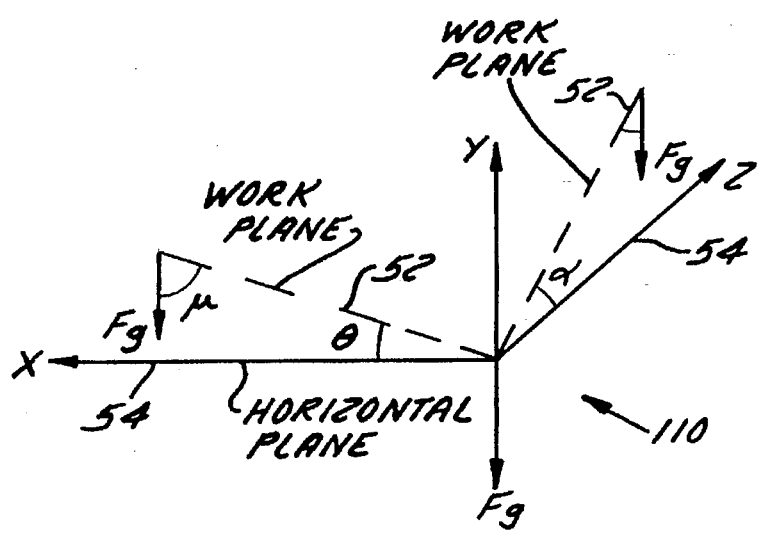
FIG. 1

1

METHOD OF BUTT WELDING

FIELD OF THE INVENTION

This invention relates to a method of butt welding a first sheet to a second sheet using a high density radiation beam and more particularly to a high energy density radiation butt welding method where surface mismatch is introduced between the sheets to be welded to minimize edge preparation required before welding and filler metal needed during welding.

BACKGROUND OF THE INVENTION

High energy density radiation beam welding, such as is accomplished using a laser beam or an electron beam, is becoming more widely used to join one sheet to another during the course of manufacturing of product made up at least in part by the sheets. Laser welders use a highly focused beam of light energy directed onto one or both sheets to join them together, while electron beam welders direct a stream of electrons onto the sheets to be welded to heat the sheets and fuse them together.

One type of welding joint commonly used to secure one sheet to another sheet is a butt-joint where an edge portion of one sheet is placed in abutting fashion generally against an edge portion of another sheet before welding the sheets together along the region where they abut. Typically, before welding, the sheets are held in place by clamps and the beam is directed against one or both of the sheets to join them together in the weld interface region.

However, before butt-welding, accurate edge preparation of the sheets to be joined must be performed so that the edge of the one sheet is parallel to the edge of the other sheet. During edge preparation, the edge of each sheet to be joined is machined to make it parallel with the edge of the other sheets so that there is virtually no misalignment or gap between the sheets when they are abutted against each other for welding. When the sheets being butt-welded are to be later formed or shaped, such as by deep drawing, edge preparation is even more critical because the width of the weld produced using a laser is quite narrow, typically about a millimeter or less in width.

Even when done properly, edge preparation is time consuming and costly. However, if edge preparation is not properly performed, when the edges of the sheets are abutted against each other to be welded, any gap or misalignment between the sheets can result in a poor weld joint between the sheets, at least in the area of misalignment or gap. Even worse, if the gap from misalignment is too great, it results in a weld having out of specification concavities in the top bead and root side, or the sheets may not be joined together in that area, possibly causing weld failure during forming or, even more undesirably when the welded sheets are in use.

Conventional welding methods, such as shielded metal arc, submerged arc, self-shielded flux-core and gas-shielded arc welding processes, are also not suitable because the resultant welded sheets have relatively wide welds and large heat affected zones making it difficult for the sheets to be easily formed, especially deeply drawn, in the region of the weld without adversely affecting weld strength and weld integrity. This can possibly result in weld failure during forming due to cracking or peeling in the weld joint or wrinkling or buckling in the region of the weld. Conventional welding methods are also ill-suited for welding sheets having corrosion resistant or low vaporizing temperature coatings because they produce relatively wide welds destroying the coating across the region of the weld and its surrounding heat affected zone. Finally, the production rates that can be achieved using conventional welding processes are relatively slow, making their use in these types of applications economically undesirable.

Lasers have been used to butt-weld metal sheets of different thicknesses, different chemistries, different mechanical properties and different coatings before further fabricating the welded sheets, such as by forming or shaping. In order to insure a high quality weld seam that can sustain a forming or shaping operation without wrinkling, buckling, splitting or cracking, the edges to be abutted to form the weld joint must be straight and parallel within tight tolerances. For example, the maximum allowable butt-joint gap between the sheets to be welded generally specified for typical commercial applications must be less than the smaller of either 0.08 millimeters or less than 10% of the cross sectional thickness of the thinnest sheet and possess a shear to brake ratio of greater than 70% or greater than 90% when welding at speeds higher than 5 meters per minute. Additionally, these commercial welding tolerance specifications typically specify that surface mismatch can be no larger than 10% where the sheets are of the same gauge, meaning that the top surfaces of the sheets to be welded must be coplanar or substantially coplanar.

However, butt welding with sheet edges produced using traditional sheet metal processing methods such as slitting, cutting, or blanking, are not suitable for producing a butt-joint that will meet these tolerance specifications or otherwise be suitable for butt welding. This is because after metal processing, the sheet edge produced usually has one or more defects, such as burrs, undesirable roll-over or an excessive shear-to-break ratio, and also can significantly deviate in straightness along each sheet edge a producing butt joints that are unsuitable for welding and which have large and varying joint fit-up gaps along the joint. Unfortunately, the metal processing defects present can vary widely from sheet edge to sheet edge, adversely affecting welding process control as well as the repeatability of producing good quality, high strength welds. This can result in a high failure and scrap rate, particularly during forming or shaping. As such, without edge preparation before welding, the resultant butt welds produced using conventional laser welding techniques heretofore known will be of poor quality, lower strength, poor integrity and are generally unsuitable for shaping or forming after welding.

Several prior art solutions have been tried in an attempt to overcome at least some of these problems. These solutions include using special, non-standard edge and butt-joint constructions, performing special edge preparation for welding, using filler material, as well as oscillating the high energy density radiation beam across the butt-joint during welding.

Methods of butt-welding utilizing non-standard sheet edge constructions and special butt-joint arrangements are disclosed in an article in the 1985 ICALEO proceedings entitled *Laser Welding of Sheet Metal Fabrications - Process Improvements* and an article in the 1992 ICALEO proceedings entitled *Investigation of Keyhole and Melt Pool Dynamics During Laser Butt-Welding of Sheet Steel Using a High Speed Camera*. Both of these articles disclose butt-welding two sheets having guillotined edges oriented such that they form an open V-shaped butt-joint configuration. The latter article also discloses using guillotined sheet edges arranged in a closed butt-joint with the beveled guillotined edges facing downwardly away from the high energy density radiation beam. Both of these experimental welding methods and butt-joint configurations disclosed require that the edges be specially cut at an angle relative to the sheet surfaces. However, this requires more sophisticated sheet cutting equipment.

As is disclosed in the aforementioned 1992 ICALEO article, to form the V-shaped butt-joint configuration disclosed, the sheets were specially sheared to provide them with guillotined edges and oriented so that their edges form a butt-joint. In one configuration depicted in this reference, the sheets were arranged in an open "V" butt-joint configuration and angled relative to the laser beam during welding for preventing humping defects. As is further disclosed in this reference, the sheets can be angled or the beam can be angled relative to the sheets because gravitational effects are asserted as being negligible. Unfortunately, this open "V" guillotined edge butt-joint configuration can produce a weld joint of poor strength and deep concavity without the addition of additional filler material because there is a large fit-up gap at the mouth of the joint. Additionally, for sheets of particularly thin cross section, this butt-joint configuration can produce a weld of poor strength and integrity. Furthermore, this method of butt welding using this type of guillotined sheet edge and butt-joint configuration requires (2) expensive and time consuming machining to be performed to produce the desired angled sheet edge or (b) special and more sophisticated cutting, slitting or blanking equipment, making this less suitable for commercial welding applications.

Methods of butt-welding two horizontally oriented sheets are disclosed in Kamogawa et al., U.S. Pat. No. 5,245,156, and in the aforementioned 1985 ICALEO proceedings article *Laser Welding of Sheet Metal Fabrications - Process Improvements*. As is disclosed in both of these references, a laser beam is oscillated across the butt-joint during welding to butt-weld the sheets together. According to these references, oscillating the beam transversely across the butt-joint as it travels along the joint can allow a joint construction with larger than normal fit-up tolerances to be used. However, these methods require additional, sophisticated, and expensive controls for oscillating the laser beam.

A method of using a laser to butt-weld two sheets of differential thicknesses that are later formed is disclosed in Frings et al., U.S. Pat. No. 4,827,100. This prior art reference discloses that to practice the welding method disclosed, corrugations or joint fit-up gaps between the abutted sheet edges should not be greater than 0.04 mm and the focused spot diameter of the beam on the work piece should be no greater than 0.2 millimeters. To maintain this tight gap tolerance, special edge preparation must be performed on the sheets before welding so that the sheet edges are square, straight, and parallel, possessing a minimum of roll-over and burrs, and have a maximum shear-to-brake ratio. However, the special edge preparation required also necessitates additional and expensive manufacturing steps to be performed, is time consuming, requires expensive capital investment for the edge processing equipment, requires additional maintenance, and also wastes sheet metal material.

As such, none of these prior art welding methods can be suitably used with sheet edges that are produced using conventional metal processing methods without special and quite extensive edge preparation, filler material, or special edge configurations and butt-joint configurations.

SUMMARY OF THE INVENTION

A method of welding using a high energy density radiation beam for butt welding two sheets having their abutting sheet edges formed using conventional metal processing techniques which produces a weld of high strength and good integrity with a minimum of edge preparation before welding and requiring a minimum of filler material during welding. Preferably, the method of this invention utilizes sheets having sheet edges produced using conventional cutting, slitting or blanking processes without preferably requiring any edge preparation or only a minimum of edge preparation before welding nor filler material during welding. Preferably, the high energy density radiation beam is a laser.

To suitably fill joint fit-up gaps while also accommodating edge defects, the method of this invention offsets the sheet surfaces adjacent the high energy density radiation beam for providing sheet material during welding that can melt and flow into the weld interface region between the sheet edges desired to be joined. To further facilitate flow of molten sheet material into the weld interface region during welding, the sheets are preferably positioned and oriented relative to the horizontal plane such that the sheets are angled downwardly along an axis generally perpendicular to the direction of welding. Preferably, the sheets are downwardly inclined in a direction generally perpendicular to the direction of welding with a portion of the sheet edge of the mismatched sheet being above the weld interface of the sheets so that the direction of gravity will urge molten sheet material to flow into the weld interface region to fill in joint fit-up gaps and accommodate edge defects. To enable the direction of gravity to influence flow of molten sheet material along the weld interface during welding, the sheets preferably are also positioned and oriented along an axis in the direction of welding so they are inclined downwardly in the direction of welding.

Before welding, the sheets are positioned with their edges in close proximity to and facing each other in a butt-joint arrangement and the sheets are preferably clamped or fixtured, such as is disclosed in U.S. application Ser. No. 08/395,478, assigned to the assignee herein and the disclosure of which is hereby incorporated by reference. To minimize and preferably eliminate edge preparation before welding, the sheets are positioned and oriented so that there is mismatch between the surfaces of the sheets that are exposed toward the high energy density radiation beam for providing sheet material that can be melted during welding to flow into the weld interface region between the sheet edges and fill any joint fit-up gaps between the sheet edges as well as accommodate any sheet edge defects or irregularities.

Preferably, the top surface of one sheet is offset relative to the top surface of the other sheet to provide surface mismatch between the sheets. So that the sheet material can flow into the weld interface, the sheets are mismatched such that a portion of a sheet edge is exposed toward the high energy density radiation beam due to the mismatch and this exposed sheet edge portion is above the weld interface.

The amount of surface mismatch introduced between the sheets preferably depends upon the amount of sheet material needed from the surface mismatched sheet to ensure adequate filling of joint fit-up gaps along the weld interface. Preferably, the amount of surface mismatch introduced between the sheets is dependent upon the maximum joint fit-up gap between the sheets. If the maximum joint fit-up gap is less than about 0.10 millimeters, the amount of surface mismatch introduced between the sheets is preferably approximately 0.10 millimeters. If the maximum joint fit-up gap is equal to or greater than about 0.10 millimeters, the amount of mismatch introduced between the sheets before welding is preferably at least 1.75 times the maximum joint fit-up gap between the sheets.

Before determining or selecting the amount of surface mismatch to introduce between the sheets to be welded, the magnitude of the maximum joint fit-up gap is preferably determined, estimated, or selected. If maximum joint fit-up gap is determined, it is preferably determined by measuring the joint fit-up gap or gaps between the sheet edges after they have been abutted against each other and determining from those measurements the largest joint fit-up gap along the butt weld joint. In a continuous welding environment, the maximum joint fit-up gap is preferably determined using on-line, joint fit-up gap measuring systems that preferably provide continuous or substantially continuous joint fit-up gap measuring capabilities.

If maximum joint fit-up gap is selected, it is preferably approximated based on the quality of the sheet edge produced with the type of cutting, slitting, or blanking process used or the nature and amount of edge preparation performed, if any has been performed. Additionally, the approximation of the maximum joint fit-up gap is also preferably dependent upon the performance of the metal cutting process employed as well as the sheet material used. Empirical data can be preferably used to assist in approximating the maximum joint fit-up gap based on the cutting, slitting, or blanking process used to cut the sheets to size thereby producing its sheet edges to be welded. Empirical data may also be used to approximate maximum joint fit-up gap based on the nature and type of edge preparation performed.

To facilitate flow of sheet material from the mismatched sheet melted during welding into the weld interface to fill joint fit-up gaps along the weld interface, the sheets are preferably positioned and oriented relative to the horizontal plane and to an axis generally perpendicular to the direction of welding such that the sheets are downwardly sloped, making the plane of the weld interface acutely angled relative to the direction of gravity. Where the maximum joint fit-up gap is less than about 0.10 millimeters, the angle of the sheets relative to the horizontal plane is preferably at least between about 3° and 30° and preferably no greater than about 45° for acutely angling the weld interface plane relative to the direction of gravity. Where the maximum joint fit-up gap is about 0.10 or greater, preferably the sheets are acutely angled relative to the horizontal plane at an angle between about 3° and about 30°, but also may be greater than 30° if a greater amount of filler material from the mismatched sheet is to be provided.

The sheets can also preferably be positioned and oriented relative to the horizontal plane so that the weld line created along the line of abutment of the sheet edges is sloped at least preferably slightly downwardly in the direction of welding so that the direction of gravity will influence flow of molten sheet material in the weld interface in a direction along the weld line as well as preferably also at least slightly influencing flow of molten sheet, material from the mismatched sheet all for facilitating filling joint fit-up gaps along the weld line and accommodating edge defects. Preferably, the downward slope of the sheets acutely inclines the weld line downwardly in the direction of welding relative to the horizontal plane at an angle relative to the horizontal plane at an angle of between about 3° and about 30°, at least approximately about 5°, and preferably no greater than about 45°. However, more aggressive angles of attack may be used if a greater influence on molten sheet material flow is required.

During welding, the beam of high energy density radiation is directed towards the plane of the weld interface and generally towards at least one of the sheets. To fill joint fit-up gaps along the weld line, at least a portion of the beam irradiates or impinges against the mismatched sheet. Preferably, at least a portion of the beam irradiates or impinges against at least part of the exposed portion of the mismatched sheet edge and/or irradiates or impinges on the top surface of the mismatched sheet adjacent the exposed edge during welding. If desired, the beam can be acutely angled relative to the plane of the weld interface or it can be generally parallel or tangent to the weld interface plane.

To maximize welding speed while preferably also minimizing welding defects, laser welding with an oblong or generally rectangular beam spot can be used, such as is disclosed in U.S. application Ser. No. 08/395480, assigned to the assignee herein, the disclosure of which is hereby incorporated by reference. If an oblong focused beam spot is used, the oblong focused beam spot can also preferably satisfy the following relationships: (1) the laser power multiplied by $10^6$ divided by 15 times the minimum power density of the oblong focused beam spot, the result of which being greater than or equal to the square of the width of the oblong focused beam spot; and (2) the laser power multiplied by $10^5$ divided by the width of the oblong focused beam spot multiplied by the minimum power density of the oblong focused beam spot, the result of which being greater than or equal to the length of the oblong focused beam spot and the length of the oblong focused beam spot being greater than or equal to about 1.5 times the width of the oblong focused beam spot. If it is desired to melt a greater portion of the sheet material, instead of being oriented such that its longitudinal axis is generally parallel to the direction of welding, the oblong focused beam spot can be oriented such that its longitudinal axis is generally perpendicular to the direction of welding.

Alternatively, an oblong focused beam spot can be "simulated" by oscillating the beam spot in the direction of welding. If such a method of "simulating" an oblong focused beam spot is used, the focused beam spot can be generally circular, non-circular or even oblong in focused spot shape. If the beam is oscillated in the direction of welding such as to "simulate" an oblong focused beam spot, the following relationship is preferably satisfied: the width of the focused beam spot divided by the welding velocity is greater than or equal to the period of oscillations of the beam spot in the direction of welding. Additionally, oscillating the beam spot in a direction generally tangent to the welding direction may also be done for initiating melting-solidification, remelting-solidification cycles.

If desired, spinning or weaving of the beam can be performed for initiating melt-solidification, remelt-resolidification cycles to minimize and preferably prevent weld defects. If particularly large fit-up gaps are present, beam weaving or spinning is preferably used to provide a greater amount of molten sheet material for filling joint fit-up gaps because of the larger surface area of beam exposure these beam traveling methods provide. If beam spinning or weaving is used, the beam is preferably directed at the exposed sheet edge as well as at the top surface of the mismatched sheet.

After welding is completed, the resultant butt weld bridges the sheets and extends completely across the weld interface, producing a weld that possesses good tensile and shear strength, resistance to torsion and bending, fatigue resistance and good integrity. Preferably, after welding is completed, the sheets form a blank that can be formed using conventional shaping or forming methods.

Objects, features and advantages of this invention are to provide a method of welding using a high energy density radiation beam for joining sheets having edges that face each other in a butt-joint configuration which produces a weld having high strength and good integrity and which will not fail during forming or shaping of the sheet after welding; minimizes costly edge preparation required before welding; minimizes the use of filler metal needed during welding; can be used to butt weld sheets having industrial quality edges; can be used to butt weld sheets having industrial quality edges with a minimum of edge preparation; can be used to butt weld sheets with edges produced by fine blanking and without additional edge preparation; can be flexibly used to butt weld sheets having edges produced by milling, laser cutting, or by shaving with a blade; can be used to weld sheets having edges not edge prepared or prepared with a minimum of edge preparation and without filler metal, saving manufacturing processing steps and material costs; can be used to join sheets of relatively thin cross-sectional thickness, of, for example, 5 mm or less in cross-sectional thickness; can be flexibly used to join sheets coated with organic or inorganic coatings or compounds; utilizes the direction of gravity during welding to facilitate flow of molten sheet material into the weld interface to fill joint fit-up gaps thereby minimizing or eliminating edge preparation required before welding as well as minimizing use of filler metal during welding; is a welding method that uses a beam of narrowly focused high energy density radiation and which is tolerant of joint fit-up gaps between the sheets as well as sheet edge defects and other edge irregularities; can utilize the direction of gravity to orient the keyhole, produced during high energy density radiation beam welding, relative to the weld interface to facilitate filling joint fit-up gaps between the sheets as well as for accommodating edge defects and irregularities; advantageously utilizes the direction of gravity to influence the formation, flow and geometry of molten material in the weld interface region as well as molten metal flowing into the weld interface region; is easily adaptable to a continuous laser welding apparatus for continuously butt welding a pair of sheets uncoiled from coiled stock; can be used to produce a blank that can be formed or three dimensionally contoured after welding such as by shaping, deep drawing, flanging, piercing, blanking, spinning, hydro-forming, bending, roll forming, die stamping, trimming, or any other forming or shaping method; can be used to produce a blank that can be shaped, formed, or otherwise three dimensionally contoured even in the region of the weld; is economical because it can be used to butt-weld two sheets together with each of the sheets having different desirable mechanical or other properties for producing a blank having the desired properties at a minimal cost while being optimized for its intended purpose; can advantageously be used to butt weld sheets of unequal thicknesses with one of the sheets being thicker than the other; can be used to butt weld two sheets of equal thickness; can be used with both autogenous and filler metal welding applications; is a method that is simple, flexible, economical and reliable; and which produces a butt weld that is durable, possesses good integrity, high tensile strength, and high fatigue resistance to cyclical and repetitive loading, and which will not fail during shaping or forming.

BRIEF DESCRIPTION OF THE DRAWINGS

These and other objects, features, and advantages of this invention will become apparent from the following detailed description of the best mode, appended claims, and accompanying drawings in which:

FIG. 1 is a perspective view of a pair of sheets with their edges facing each other to form a butt-joint and being welded by a high energy density radiation beam using a method of welding of this invention;

FIG. 7 is a fragmentary sectional view of a pair of sheets of differential gauge thickness arranged to form a butt-joint with the sheet of smaller cross-sectional thickness being positioned relative to the thicker sheet so that there is surface mismatch on top and bottom of the sheet;

FIG. 12 is an enlarged fragmentary sectional view of the sheets after welding has been completed;

DETAILED DESCRIPTION OF THE INVENTION

Figure 2:
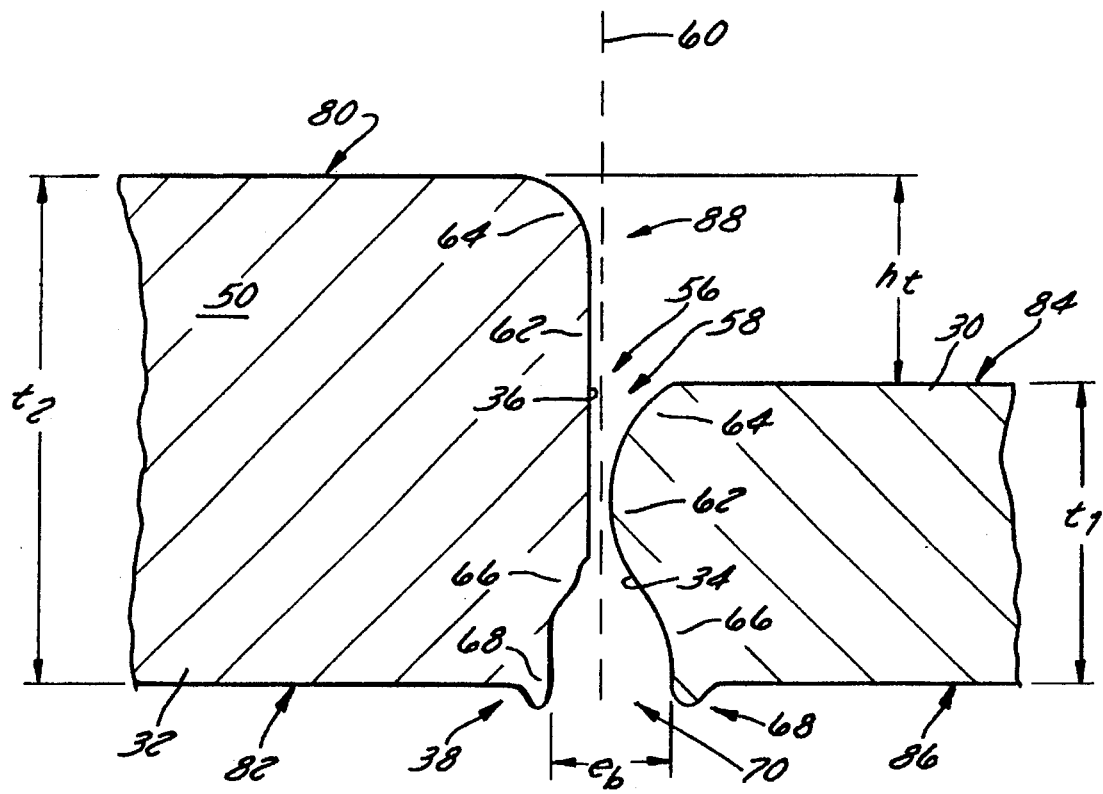
FIG. 2 is an enlarged fragmentary front view of the sheets along line 2—2 of FIG. 1 more clearly illustrating the sheet edges including edge defects and joint fit-up gaps present in the sheet edges as a result of metal processing operations carried out to cut the sheets to size before welding.
Figure 3:
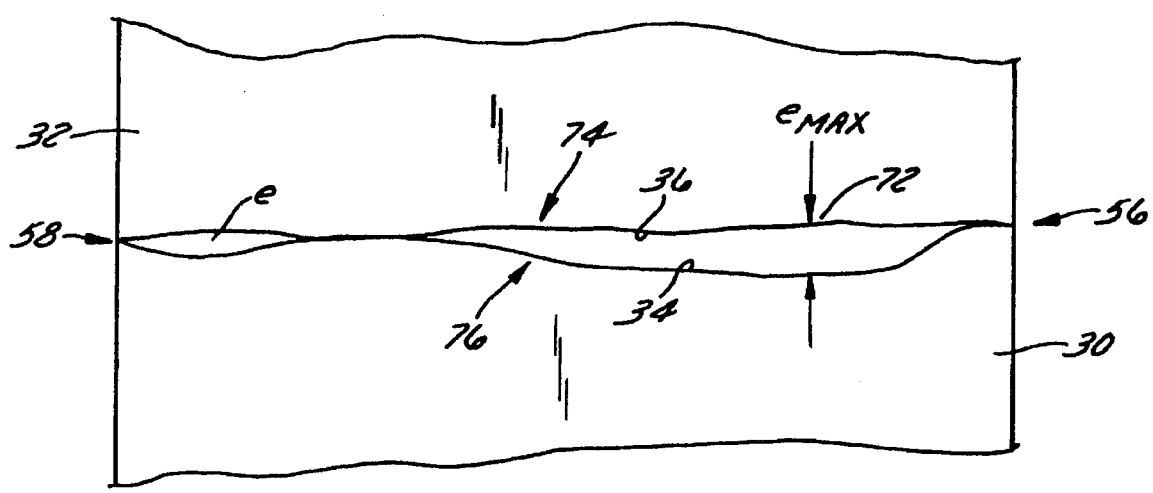
FIG. 3 is a top view taken along line 3—3 of FIG. 1 illustrating more clearly joint fit-up gaps between the sheet edges and variation in size in joint fit-up gaps along the abutted sheet edges.

Referring now to the drawings, FIGS. 1–3 illustrate a method of butt welding a first sheet 30 to a second sheet 32 having their edges 34 & 36 facing each other in a butt-joint arrangement 38 using a high energy density radiation beam 40 from a high energy density radiation source 42 for joining the sheets 30 & 32 together with a butt weld 44 possessing high strength and good integrity for creating a blank 46 that can be formed after welding using conventional forming methods, such as bending, deep drawing, roll-forming, hydro-forming, shaping, flanging, trimming, piercing, die stamping, or another conventional shaping or forming process. To enable the sheets 30 & 32 in their as-cut, as-slit or as-blanked condition to be butt welded preferably without performing edge preparation before welding, the sheets 30 & 32 are oriented relative to each other to form the butt-joint 38 with surface mismatch 48 between the sheets 30 & 32 for providing molten sheet metal material during welding to accommodate joint fit-up gaps between the sheets 30 & 32 as well as to accommodate defects and other irregularities in the sheet edges 34 & 36.

The method of this invention preferably enables sheets to be welded in their as-lit, as-cut or as-blanked condition. Preferably, the method of this invention also enables sheets having industrial grade quality edges and sheets having edges produced as a result of a fine blanking metal process to be butt-welded with a minimum of and preferably no edge preparation required before welding. Preferably, this method also enables sheets having edges produced by other metal processing techniques, such as milling, laser cutting, shaving with a blade, or another like metal processing technique, to be butt welded.

Preferably, surface mismatch 48 is purposely introduced between the sheets 30 & 32 so that there is sufficient excess sheet material that can be melted during welding to fill any joint fit-up gaps between the sheet edges 34 & 36 and accommodate edge defects while still producing a butt weld 44 of good integrity, high strength, and which will be able to withstand forming or shaping. To urge molten sheet material from the mismatched sheet 50 toward the butt-joint 38 during welding to fill joint fit-up gaps and accommodate edge defects, the sheets 30 & 32 are preferably positioned and oriented so they form a work plane 52 that is acutely angled relative to the direction of gravity, $F_g$, by being angularly oriented from the horizontal plane 54. Preferably, the sheets 30 & 32 are positioned and oriented such that they are downwardly angled transverse to the direction of welding and inclined downwardly in the direction of welding so that the direction of gravity, $F_g$, will advantageously influence the flow of molten sheet material in the region of the butt-joint 38 during welding.

So that the sheets 30 & 32 can be welded using a high energy density radiation beam 40, the sheets 30 & 32 are constructed of a weldable material such as steel, nickel, aluminum, copper, or another metal. One or both sheets 30 & 32 can be coated with an organic or inorganic coating, such as for example, a zinc coating applied to one or both sides of a steel sheet to impart corrosion resistance to the sheet.

Preferably, the high energy density radiation beam 40 is a laser beam or an electron beam. If the source of high energy density radiation 42 is a laser, it preferably is a $CO_2$ laser, a CO laser, an excimer laser, another type of gas laser, or a solid state laser such as a YAG laser. If the radiation beam source 42 is a laser, it can be a laser operating in continuous wave mode, pulse mode, modulated mode, rippled mode, or another type of operating mode.

Advantageously, the method of high energy density radiation beam welding of this invention and the resultant butt-weld produced by this method enables two sheets 30 & 32 to be butt-welded to produce a blank 46 that can be formed after welding, with each sheet 30 & 32 selected to impart to the blank 46 certain desired properties at least in a localized region or regions of the blank 46 needing those desired properties. Preferably, in constructing such a blank 46, two, three or more sheets can be welded together to construct the blank 46, with at least two of the sheets being butt-welded together using the method of this invention. As such, by imparting to the blank 46 desired mechanical or other properties only where needed, thinner gauge and/or less expensive sheet material can be used elsewhere in constructing the blank 46 where those properties are not needed, making the blank 46 less costly to manufacture while still being suitable and optimized for its intended use after forming or shaping of the blank 46 is completed.

As is shown more clearly in FIG. 1, the first sheet 30 is placed in close proximity to the second sheet 32 forming a butt-joint 38. As is depicted more clearly in FIG. 2, the first sheet 30 has a cross-sectional thickness $t_1$, that differs from the cross-sectional thickness, $t_2$, of the second sheet 32. In constructing the butt-joint 38, an edge 34 of the first sheet 30 is placed in close proximity to an edge 36 of the second sheet 32 so that they preferably abut against each other, at least in some places along a weld line 56 where the two sheets 30 & 32 meet. As is shown more clearly in FIG. 3, the sheet edges 34 & 36 face and abut each other forming a weld interface 58 between the sheet edges 34 & 36 as is indicated by a weld interface plane 60 illustrated in phantom between the sheet edges 34 & 36. To retain the sheets 30 & 32 in the butt-joint configuration 38 so that there is surface mismatch 48 between the sheets 30 & 32, they are preferably fixtured or clamped such as by copper clamps preferably having a refrigerant flowing through the clamps (not shown) during welding. Preferably, refrigerated clamps are used for preventing heat stress from pulling the sheets 30 & 32 apart and enlarging joint fit-up gaps, including $e_{max}$, between the sheets 30 & 32

Preferably, the weld interface plane 60 is generally parallel to or generally tangent with the direction of shear of at least one of the sheet edges 34 & 36, even if the direction of shear is not perpendicular or generally perpendicular to the top and bottom surfaces of the sheets 30 & 32. The shear plane or area of each sheet edge 34 & 36 is indicated by reference numeral 62 shown in FIG. 2 and indicates generally the direction of shear of each sheet edge 34 & 36 due to metal processing performed to cut each sheet to size before welding.

Preferably, no edge preparation of the sheet edges 34 & 36 is required before welding or at least edge preparation of the sheet edges is minimized before positioning the sheets 30 & 32 with their sheet edges 34 & 36 in the butt-joint arrangement 38 shown in FIGS. 1–3, by using sheets having edges in the as-cut, as-cut, as-sheared or as-blanked condition. The edges 34 & 36 produced may have also been the result of cutting the sheets 30 & 32 to the desired size before welding using a conventional milling or laser cutting process or by shaving the edges with a blade (not shown).

Preferably, the sheets 30 & 32 can be welded using the method of this invention with their sheet edges 34 & 36 in the as-cut, as-sheared, as-slit, as-sheared, or as-metal processed condition and without edge preparation. Such sheet edges are typically referred to as being of industrial grade edge quality, such as is depicted by the sheet edges 34 & 36 shown in more detail in FIG. 2. Such an industrial grade quality sheet edge has a shear area 62 as a result of the cutting process used and can have one or more undesirable edge defects or imperfections such as roll-over 64, a break area 66 and/or one or more burrs 68 with a shear-to-break ratio of less than 80%. Alternatively, the method of this invention can also be used to butt weld two sheets having sheet edges produced using a fine blanking metal processing process or using industrial quality edges with a minimum of edge preparation before welding.

For example, industrial quality sheet edges, such as the edges 34 & 36 depicted in FIG. 2, can have a shear-to-break ratio of 70% or less, making butt-welding of such edges more difficult to perform using conventional high energy density radiation beam butt-welding methods because of material missing between the sheet edges due to excessive break 66. For example, when sheet edges 34 & 36 having a break 66 are abutted against each other, the break 66 results in a joint fit-up gap, $e_b$, 70 along the bottom of the butt-joint 38 which is sheet material that is missing that preferably will be suitably filled in during welding.

Another problem caused by metal processing is that the sheet edges may not be straight, such as is more clearly shown in FIG. 3. This can result in the sheets 30 & 32 having a maximum joint fit-up gap, $e_{max}$, 72 between the sheet edges 34 & 36 that is greater than about 0.08 millimeters, making it difficult, if not impossible, for sheets having such excessive joint fit-up gap to be adequately butt welded using conventional high energy density radiation beam welding methods without significant edge preparation as well as possibly requiring filler metal during welding. In fact, due to lack of straightness between the sheet edges 34 & 36 and variation in straightness, joint fit-up gaps, e, 70 can be found along the weld line 56 or weld interface 58 between the sheet edges 34 & 36, some of which may be greater than about 0.08 millimeters. As is further shown in FIG. 3, a single gap 76 can vary in magnitude along the weld line 56 or weld interface 58 because of variations in straightness between the sheet edges 34 & 36.

Figure 4:
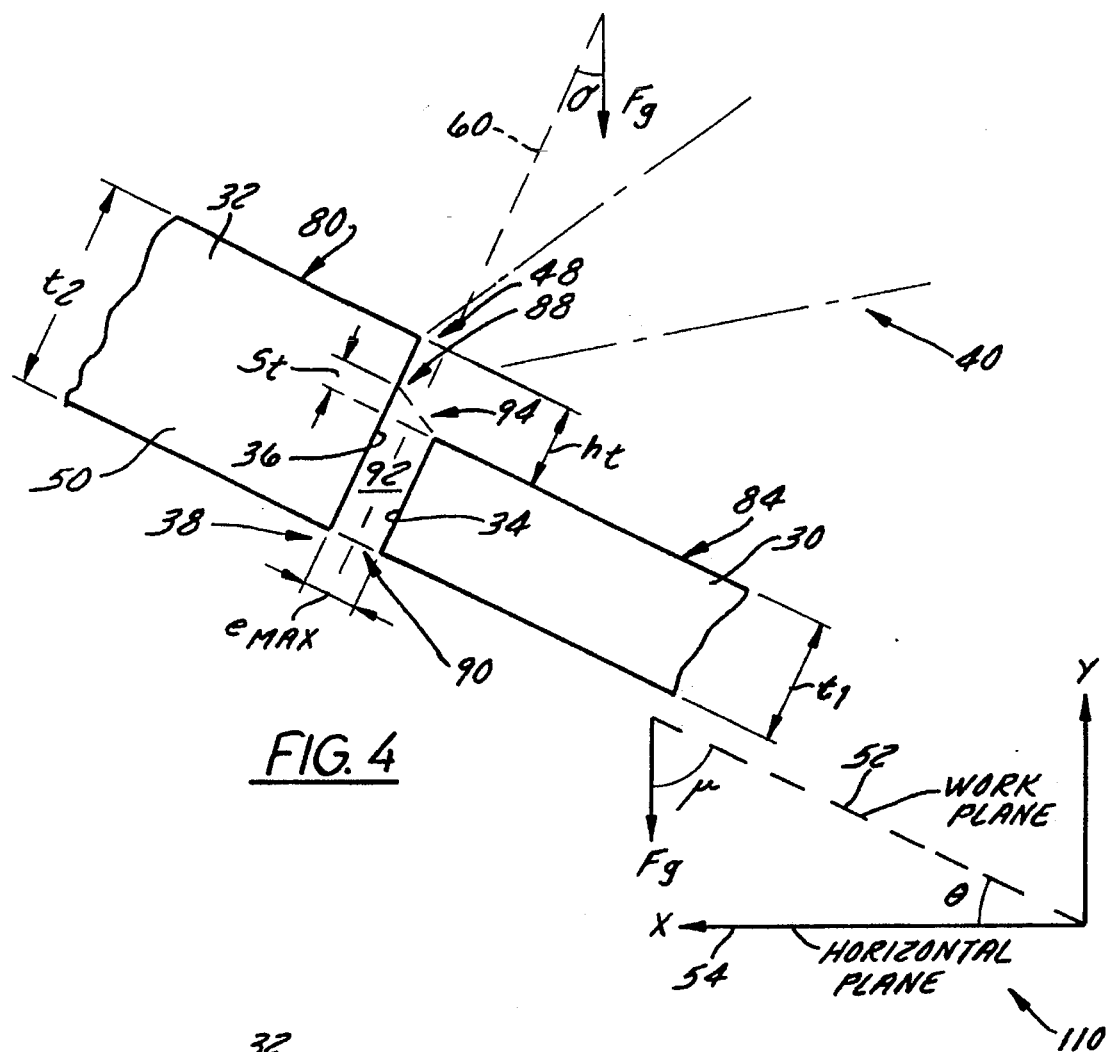
FIG. 4 illustrates an enlarged front view of the sheets shown in FIG. 1 depicting in phantom missing material preferably to be supplied during welding to fill joint fit-up gaps between the sheet edges using the method of this invention.

To butt weld sheets 30 & 32 having industrial quality edges 34 & 36 so that edge preparation is minimized and preferably not needed, one of the sheets is positioned and oriented relative to the other of the sheets so that a top surface of the one sheet is offset from a top surface of the other sheet creating a region of surface mismatch 48 between the sheets. As is shown in FIGS. 2 & 4, the first sheet 30 has a top surface 80 and a bottom surface 82, and the second sheet 32 has a top surface 84 and a bottom surface 86. To introduce surface mismatch 48 between the sheets 30 & 32, the sheets 30 & 32 are positioned and oriented in a butt-joint arrangement 38 such that the top surfaces 80 & 84 of the sheets 30 & 32 are offset from each other.

Preferably, the sheets 30 & 32 are positioned and oriented relative to each other such that their top surfaces 80 & 84, that is the surfaces exposed toward the high energy density radiation beam, are offset so the surfaces are not coplanar nor generally or substantially coplanar. As is shown in FIGS. 1, 2 & 4, the sheets 30 & 32 are positioned and oriented to expose a portion 88 of the sheet edge of the mismatched sheet 50. Preferably, the exposed sheet edge portion 88 is oriented toward the high energy radiation beam, as is illustrated in FIG. 4.

As is shown more clearly in FIG. 4, the amount or magnitude of surface mismatch 48 introduced between the sheets 30 & 32 is denoted by the reference character, $h_t$. The amount of surface mismatch, $h_t$, introduced between the sheets 30 & 32 is preferably dependent upon the amount or volume of sheet material missing between the sheet edges 34 & 36 as a result of joint fit-up gaps, e, between the sheet edges 34 & 36. To produce a butt weld of good integrity and high strength, the amount of surface mismatch, $h_t$, between the sheets 30 & 32 is preferably selected, chosen or determined to provide enough sheet material that is melted during welding that will fill in joint fit-up gaps, e, between the sheets 30 & 32. Preferably, the amount of surface mismatch, $h_t$, between the sheet surfaces 80 & 84 is dependent upon the maximum joint fit-up gap, $e_{max}$, between the sheet edges 34 & 36 so that there is sufficient sheet material to be melted during welding to fill joint fit-up gaps, e, including joint fit-up gaps that are as large as the maximum joint fit-up gap, $e_{max}$, as well as bottom joint fit-up gaps, $e_b$, (FIG. 2) along the weld interface 58 while also accommodating edge defects in the sheet edges 34 & 36.

Preferably, the amount of mismatch, $h_t$, between the sheets 30 & 32 is at least about 0.1 millimeters to provide a sufficient amount or volume of sheet material to fill in joint fit-up gaps, e, and edge defects along the weld interface 58. Preferably, the maximum joint fit-up gap, $e_{max}$, between the sheet edges 34 & 36 is no greater than about 10% of the cross sectional thickness of the thickest sheet and can be greater than about 0.08 millimeters. The maximum joint fit-up gap, $e_{max}$, between the sheet edges 34 & 36 can also be less than 0.08 millimeters.

As is depicted more clearly in FIG. 4, to determine the material missing 90 between the sheets 30 & 32 that must be provided during welding to fill in joint fit-up gaps, e, and accommodate edge irregularities, $e_{max}$ is preferably determined or selected. If $e_{max}$ is determined, it is preferably determined by measuring the distance between the sheet edges 34 & 36 of the butt-joint 38 and determining the largest distance between the sheet edges 34 & 36. If $e_{max}$ is selected, it is preferably estimated based upon the type of metal processing method used to cut the sheets 30 & 32 to size as well as quite possibly other parameters such as cross sectional thicknesses of the sheets 30 & 32, material of the sheets used, and/or the type, strength and quality of the butt weld desired to be produced. As such, if $e_{max}$ is approximated, it preferably is approximated based at least on the performance and type of milling, slitting, cutting, blanking or shearing operation performed to cut each sheet to size, as well as the type of material of the sheets being cut to size.

Preferably, the material missing 90 can be approximated as the region bounded by the rectangle 92 shown in phantom in FIG. 4 between the sheet edges 34 & 36. The boundaries of this rectangle 92 are determined by where the sheet edges 34 & 36 face and overlap each other with the dashed lines defining the top and bottom of the rectangle 92 extending from one sheet edge to the other sheet edge at the point of upper and lower overlap of the sheet edges 34 & 36. The amount of metal missing during welding to fill joint fit-up gaps along the weld line can be approximated as:

$$MM = e_{max} * t_1$$

where:

MM is the amount of material missing;

$e_{max}$ is the maximum joint fit-up gap between the sheets 30 & 32; and $t_1$ is the thickness of the thinnest sheet 30 since the width of overlap between the sheets is approximately equal to $t_1$.

To more accurately account for material desired to fill in joint fit-up gaps along the weld interface 58, the missing material 90 preferably needed can be further approximated by the triangle 94 shown in FIG. 4 in phantom above the rectangle 92. The amount of metal missing and needed to be provided during welding to fill joint fit-up gaps along the weld line can be more accurately preferably approximated as:

$$MM = e_{max} * t_1 + \tfrac{1}{2} e_{max} * s_t = e_{max}(t_1 + \tfrac{1}{2} s_t)$$

where:

MM is the amount of material missing;

$e_{max}$ is the maximum joint fit-up gap between the sheets 30 & 32;

$t_1$ is the thickness of the thinnest sheet 30 since the width of overlap between the sheets is approximately equal to $t_1$; and $s_t$ is the length of the leg of the triangle of the convexity.

Preferably, $s_t$ is about 0.1 millimeters or a sufficient value for ensuring that the resultant geometry of the butt weld 44 does not have any weld surface irregularities with sharp angles of less than about 90° so that weld 44 provides a smooth transition between the sheets 30 & 32. Preferably, the amount of surface mismatch, $h_t$, as well as the angle of inclination of the sheets 30 & 32 relative to the direction of gravity, $F_g$, is selected based upon the amount of missing material, MM, that must be provided during welding to join the sheets together and produce a butt weld 44 of high strength and good integrity.

Of course, to approximate the volume of missing material preferably needed to be provided, the amount of missing material, MM, simply needs to be multiplied by the length of the weld line 56 of the butt-joint 38 of the abutted sheets 30 & 32. Preferably, as a result of the surface mismatch 48 introduced between the sheets 30 & 32, at least some and preferably most, if not virtually all, of the material missing, MM, between the sheet edges 34 & 36 is provided during welding by the mismatched sheet 50.

During welding, as is shown in FIGS. 1 and 4, the high energy density radiation beam 40 is preferably directed toward the plane 60 of the weld interface 58 created where the two sheet edges 34 & 36 generally face and/or abut each other. The beam 40 can be focused on the exposed portion 88 of the sheet edge of the mismatched sheet 50 for melting sheet material above the weld interface so that it will flow into the weld interface region 58 between the sheet edges 34 & 36 and fill joint fit-up gaps, e, as well as accommodate edge defects and other imperfections in one or both sheet edges 34 & 36. If desired, the beam 40 can also be focused on the top surface of the mismatched sheet 50 adjacent the exposed edge portion 88 for melting sheet material above the weld interface region 58.

Figure 5A:
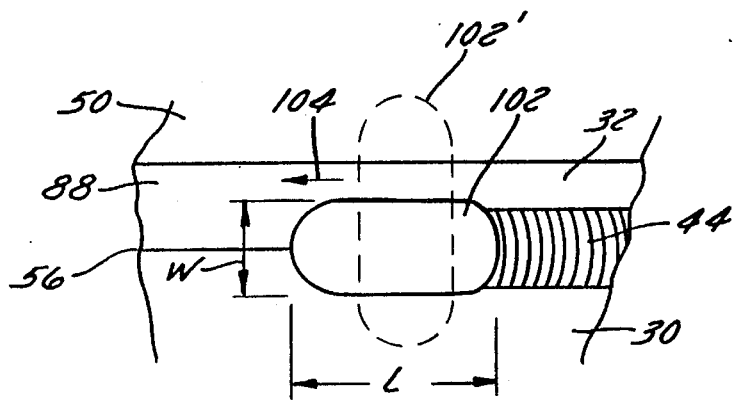
FIG. 5A is an enlarged fragmentary perspective view of that portion of the sheets enclosed by the circle 5 in FIG. 1 illustrating more clearly the use of an oblong focused beam spot to butt weld the sheets together.

Although a beam 40 having a focused beam spot 100 of circular cross section can be used to butt weld the sheets 30 & 32 together using the method of this invention, an oblong or generally rectangular focused beam spot 102 such as that shown in FIG. 5A can also be used. For laser welding, if an oblong focused beam spot 102 is used, it preferably satisfies the following parameters:

$$w^2 \leq (P*10^6 \div P_{densmin})$$

and $$1.5*w \leq L \leq (P*10^5) \div (w*P_{densmin})$$

where:

w is the width of the oblong focused beam spot (mm);

L is the length of the oblong focused beam spot (mm);

P is the power of the high density radiation beam (kw); and $P_{densmin}$ is the minimum power density to achieve keyhole welding for the material being welded (W/cm$^2$) and for the particular high energy density radiation beam being utilized.

Although the oblong focused beam spot is preferably oriented such that its longest axis is oriented generally tangent to the direction of welding, it can be oriented with its longitudinal axis at an acute angle to the direction of welding. Additionally, if it is desirable to irradiate additional material of the mismatched sheet 50, the oblong focused beam spot can be oriented with its longitudinal axis generally perpendicular to the direction of the welding, as is shown by the oblong focused beam spot 102' depicted in phantom in FIG. 5A. The direction of welding is indicated in FIG. 5A by an arrow 104 and is preferably generally tangent to the weld line 56.

Figure 5B:
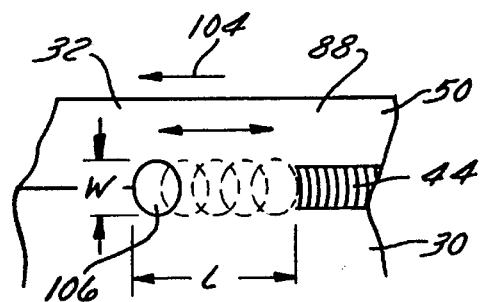
FIG. 5B is an enlarged fragmentary perspective view of that portion of the sheets enclosed by the circle 5 in FIG. 1 showing a method of "simulating" an oblong focused beam spot by oscillating a beam back and forth along the weld line in the direction of welding.

Additionally, a focused beam spot 100 having a generally circular beam spot 106 can be used, such as that shown in FIG. 5B. As is further shown in FIG. 5B, the generally circular focused beam spot 106 can be oscillated back and forth both in a direction that is preferably generally tangent to the direction of welding 104 of welding such as for "simulating" an oblong beam focused spot while also preferably initiating melting-solidification, remelting-resolidification cycles. If beam spot oscillating is used, the period of oscillations of the beam spot, welding speed and beam spot width (which is the diameter of the beam spot for a circularly focused beam spot) preferably are related in the following manner:

$$T \leq (w \div V)$$

where:

T is the period of the oscillations of the focused beam spot;

w is the width of the focused beam spot; and

V is the welding speed.

For example, using the above equation, if V=100 mm/sec and w=0.03 millimeters, the period of the oscillations of the beam spot is $T \leq 3$ msec. Therefore, the frequency, f, of oscillations of the beam spot is preferably about $f=1/T \geq 333$ Hertz.

Of course, the beam spot 106 can be oscillated at an angle that is acute to the direction of welding 104, if desired. Additionally, a beam spot of oblong or generally rectangular cross section can also be oscillated in this manner in the direction of welding. Weaving or spinning of the beam 40 can also be performed as the beam 40 travels along the sheets 30 & 32 such as for initiating melting-solidification, remelting-resolidification cycles to minimize weld defects.

As is further depicted in FIG. 1, to facilitate flow of molten sheet material into and along the weld interface region 58 between the sheet edges 34 & 36 during welding, the sheets 30 & 32 are preferably positioned and oriented relative to the horizontal plane 54 so that the work plane 52 of the sheets 30 & 32 is acutely angled relative to the direction of gravity $F_g$, as is indicated more clearly by an angular indicator 110 shown in FIGS. 1 & 4. Represented in phantom in FIG. 1 is the work plane 52 angled acutely relative to horizontal plane 54 (shown in solid line) for urging molten sheet material to flow into the weld interface region 58 and preferably also for influencing formation, flow, and geometry of a nugget of molten sheet material formed during welding. If the high energy density radiation beam 40 is a laser beam, the acute angle of the sheets 30 & 32 relative to the horizontal plane 54 enables the utilization of the direction of gravity, $F_g$, for preferably advantageously orienting the keyhole in the molten sheet material formed during welding. By acutely orienting the sheets 30 & 32 acutely relative to the horizontal plane 54, the weld interface plane 60 is also acutely angled relative to the direction of gravity, $F_g$, as is shown more clearly in FIG. 4.

So that sheet material flows from the mismatched sheet 50 into the weld interface region 58 and between the sheet edges 34 & 36 during welding, the sheets 30 & 32 are positioned and oriented as is shown in FIG. 1 such that the exposed mismatched sheet edge 88 is above the weld interface 58 to enable the direction of gravity, $F_g$, to urge molten sheet material from the mismatched sheet 50 into the weld interface region 58 and between the sheet edges 34 & 36. Referring to the angular indicator 110 shown in FIG. 1, the sheets 30 & 32 are oriented relative to the X-Y plane of the angular indicator 110 so that the work plane 52 of the sheets 30 & 32 is acutely angled at an angle θ relative to the horizontal plane 54 in the X-Y plane.

This results in the sheets 30 & 32 being acutely angled in a direction generally transverse or perpendicular to the direction of welding so that when sheet material from the mismatched sheet edge region 88 is melted during welding, it tends to flow downwardly due to the direction of gravity, $F_g$, and into the weld interface region 58 between the sheet edges 34 & 36 to fill joint fit-up gaps, e, between the sheets 30 & 32 as well as accommodate edge defects in the sheet edges 34 & 36. Thus, the sheets 30 & 32 positioned such that their work plane 52 is acutely angled transverse to the welding direction at an angle of μ relative to the direction of gravity, $F_g$, with the weld interface plane 60 (shown in phantom in FIGS. 2 & 4) being acutely angled at a complementary angle of σ relative to the direction of gravity, $F_g$, as is further shown in FIG. 4.

Preferably, the sheets 30 & 32 are angled in the transverse direction such that θ preferably falls within the following range for supplying the desired missing material, MM, between the sheet edges:

$$0° \leq \theta \leq 30°$$

Preferably, θ is at least about 3°. However, for particularly large fit-up gaps, θ may be adjusted such that it falls outside of the indicated preferred 3° to 30° range. Preferably, θ is no greater than about 45°.

As is also depicted in FIG. 1, to facilitate flow of molten sheet material along the weld line 56 and preferably generally in the direction of welding, the sheets 30 & 32 are preferably also positioned and oriented such that the sheets 30 & 32 are inclined downwardly in the direction of welding. So that the molten weld nugget will tend to flow generally in the direction the high energy density radiation beam 40 is traveling along the sheets 30 & 32 for preferably reducing concavities in the resultant butt weld 44, the sheets 30 & 32 are oriented so that its work plane 52 is also preferably inclined in the Y-Z plane, as is shown by the angular indicator 110 in FIG. 1. As is also illustrated by the angular indicator 110, the sheets 30 & 32 are acutely angled in the Y-Z plane relative to the horizontal plane 54 at an angle α so that the direction of gravity, $F_g$, will influence flow of the weld nugget longitudinally along the weld interface 58 in the direction of welding. Preferably, by the sheets 30 & 32 being inclined relative to gravity, $F_g$, in the Y-Z plane, the molten weld nugget preferably "flows" along the weld interface during welding for preferably minimizing concavities in the resultant butt weld 44.

Preferably, the sheets 30 & 32 are positioned and oriented relative to the horizontal plane 54 such that the weld line 56 of the sheets is downwardly sloped such that α preferably falls within the following range:

$$0° \leq \alpha \leq 30°$$

Preferably, for most applications, α is at least about 3° and preferably no greater than about 45°.

Figure 6:
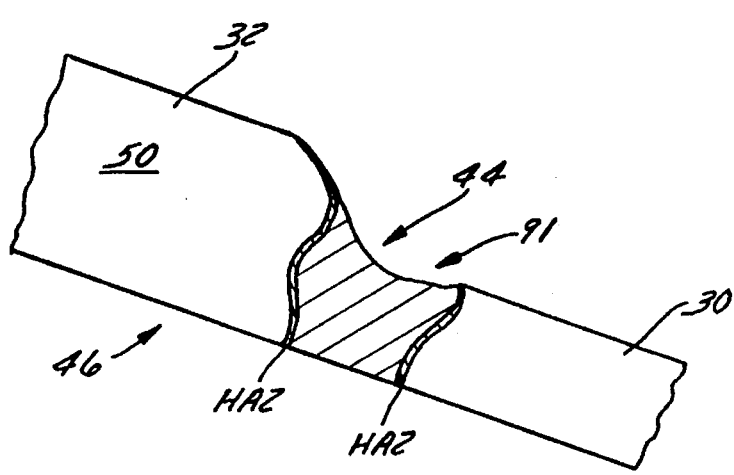
FIG. 6 is an enlarged fragmentary front view of the sheets showing the butt weld after welding has been completed.

After welding of the sheets 30 & 32 is completed, the resultant butt weld 44 is of good integrity and possesses high strength, joining the sheets 30 & 32 to form a blank 46 that preferably can be formed, shaped or otherwise three dimensionally contoured. Preferably, the resultant weld 44 possesses high tensile strength, good torsion resistance, good shear strength and tolerates bending well without failing for enabling the blank 46 to suitably formed or shaped. Preferably, the resultant weld 44 has a relatively narrow heat affected zone (HAZ) for minimizing destruction of any coating on the sheets 30 & 32. Preferably, the resultant weld seam 91 produced between the sheets by the weld 44 is smooth producing a relatively smooth, transition between the two sheets 30 & 32, as is shown in FIG. 6.

Figure 8:
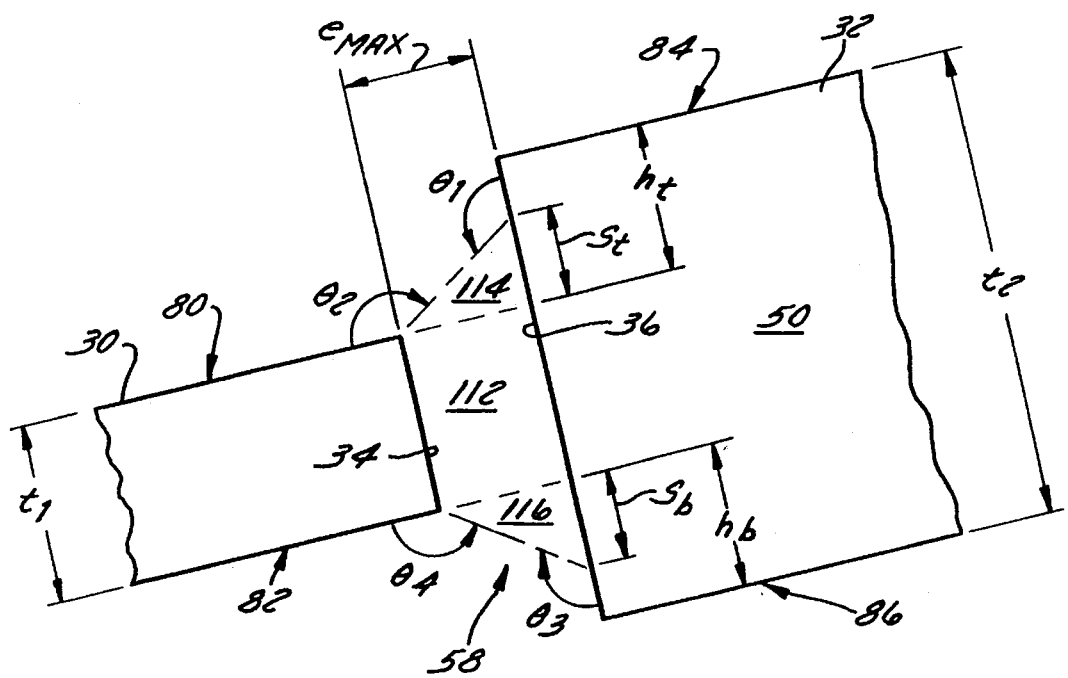
FIG. 8 is an enlarged fragmentary front view of the pair of sheets shown in FIG. 7 for illustrating more clearly the missing material desired to be provided during welding to fill joint fit-up gaps between the sheets.
Figure 9:
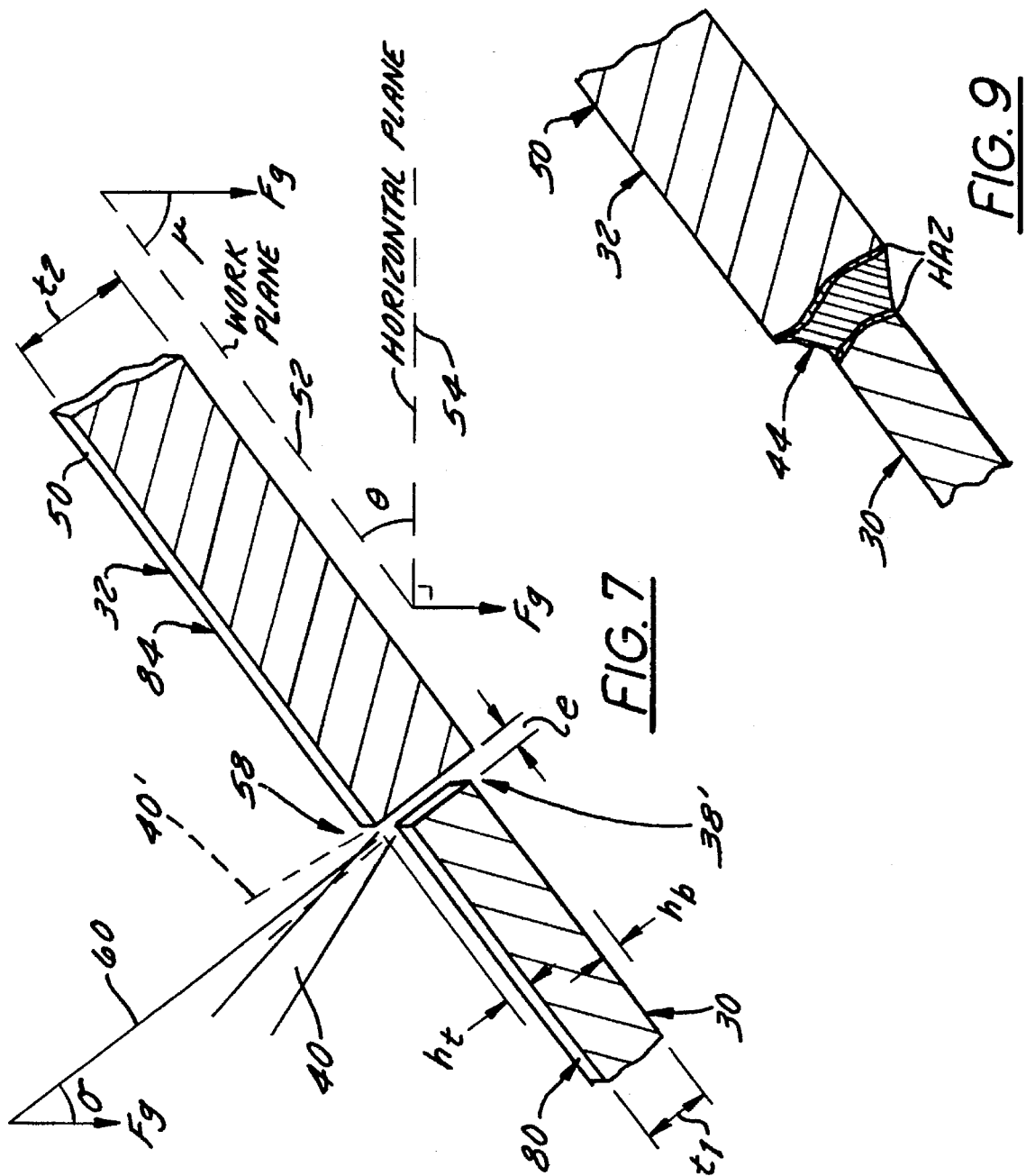
FIG. 9 is an enlarged fragmentary sectional view of the sheets after welding has been completed.

FIGS. 7–9 illustrate a butt-joint 38' having one sheet 30 thinner than the other sheet 32 and with the one sheet edge 34 abutted against the other sheet edge 36 such that there is surface mismatch, $h_t$, along the top bead side of the weld interface region 58 and surface mismatch, $h_b$, along the bottom root side of the interface 58. Alternatively, the sheets 30 & 32 can be downwardly inclined in the direction of welding without being inclined in a direction generally transverse to the welding direction. Preferably, the sheets 30 & 32 are downwardly inclined in the direction of welding and relative to the direction of gravity, $F_g$.

Referring to FIG. 8, the amount of material missing, MM, between the sheet edges 34 & 36 is represented in phantom by a rectangle 112 between the sheet edges 34 & 36 also including a triangle 114 above the rectangle 112 and a triangle 116 below the rectangle 112. To ensure that there preferably is sufficient sheet material to produce a butt weld joining the sheets 30 & 32 and having a desirable amount of convexity, such as for conforming to some standard industry butt welding specifications, the angle and/or distance of the leg of each triangle 114 & 116 is preferably selected such that $\Theta_1$ and $\Theta_3$ are greater than about 90°, particularly when $s_t \geq 0.1$ mm and $s_b \geq 0.1$ mm. For determining the amount of surface mismatch, $h_t$, at the top bead side of the weld interface 58, the amount of missing material, MM, to preferably be provided during welding to fill joint fit-up gaps, $e_{max}$ and/or e, along the weld line 56 can be approximated as:

$$MM = e_{max}*t_1 + \tfrac{1}{2}e_{max}*s_t + \tfrac{1}{2}e_{max}*s_b$$

and if $s_t \approx s_b \approx s \approx 0.1$ mm;
then $$MM = e_{max}*(t_1+s) \approx e_{max}*(t_1+0.1 \text{ mm})$$

where:
- MM is the material missing between the sheet edges preferably provided by the mismatched sheet;
- $t_1$ is the distance of overlap between the sheet edges (in this case, the thickness, $t_1$, of the thinnest sheet);
- $e_{max}$ is the maximum joint fit-up gap between the sheets;
- $s_t$ is the leg of the upper triangle adjacent the top root side of the weld interface; and $s_b$ is the leg of the lower triangle adjacent the bottom root side of the weld interface.

Preferably, the angle of inclination, θ, of the sheets 30 & 32 relative to the horizontal plane 54 transverse to the welding direction is preferably selected based upon the amount of missing material, MM, required. Additionally, preferably, the amount of surface mismatch, $h_t$, between the sheets 30 & 32 along the top root side of the weld interface 58 is preferably also based on the amount of missing material, MM, desired. To supply the desired amount of missing material, MM, all along the sheet edges 34 & 36 along the weld line 56, assuming a worst case joint fit-up gap of $e_{max}$, the selection of $h_t$ and θ preferably falls within the following limits:

$$\tan 3° \leq (e_{max} \div h_t) \leq \tan \theta \leq \tan 30°$$

and, preferably, $h_t \geq 1.75 * e_{max}$.

During welding, the high energy density radiation beam 40 is directed toward the plane 60 of the weld interface 58. As is shown in FIG. 7, the beam 40 is directed at the weld interface 58 such that preferably a portion of the beam 40 impinges upon the exposed region of the mismatched sheet edge 88 along the top root side of the weld interface 58. As is shown in phantom in FIG. 7, the beam 40' can be directed at the weld interface 58 with the axis of the beam 40' generally parallel to the weld interface plane 60. The beam 40 also can be directed at a portion of the top surface 84 of the mismatched sheet 50 adjacent the exposed edge 88 such as if additional sheet material is needed.

As is shown in FIG. 9, when welding is completed, the butt weld 44 extends longitudinally along the weld line 56 and completely across the weld interface 58 joining the sheets together with a weld 44 of high strength and good integrity. If any concavities are present in the resultant butt weld 44, the minimum cross sectional thickness of the weld 44 is preferably at least 80% of the sheet having the thinnest cross sectional thickness. Preferably, if concavities are present, the angles defining each concavity are preferably greater than about 90°. After welding is completed, the two sheets 30 & 32, of dissimilar cross sectional thicknesses, preferably can be shaped, formed or otherwise three dimensionally contoured.

Figure 10:
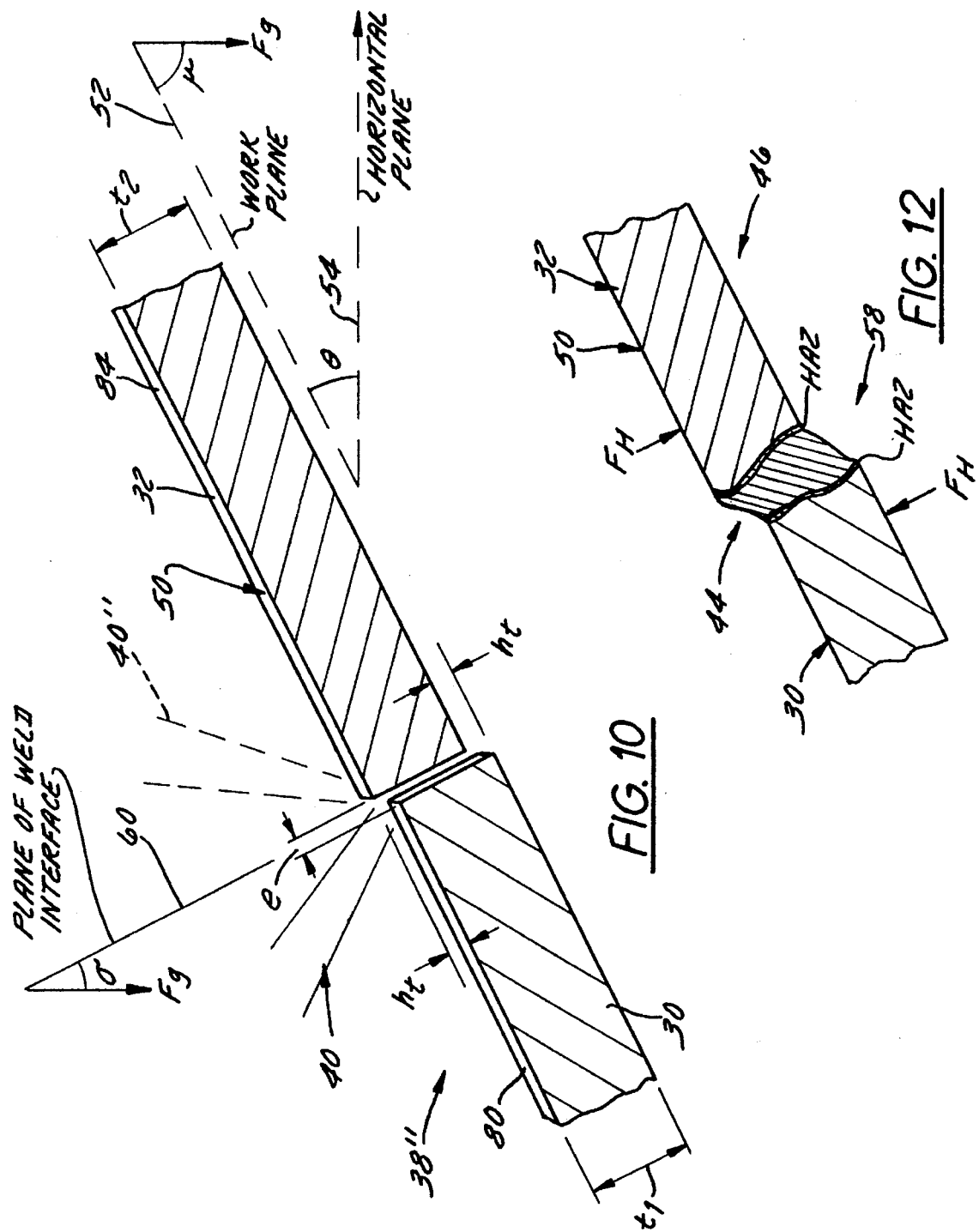
FIG. 10 is an enlarged fragmentary sectional view of a pair of sheets having the same cross sectional thickness with the sheets oriented relative to each other to form a butt-joint with surface mismatch between the sheets.
Figure 11:
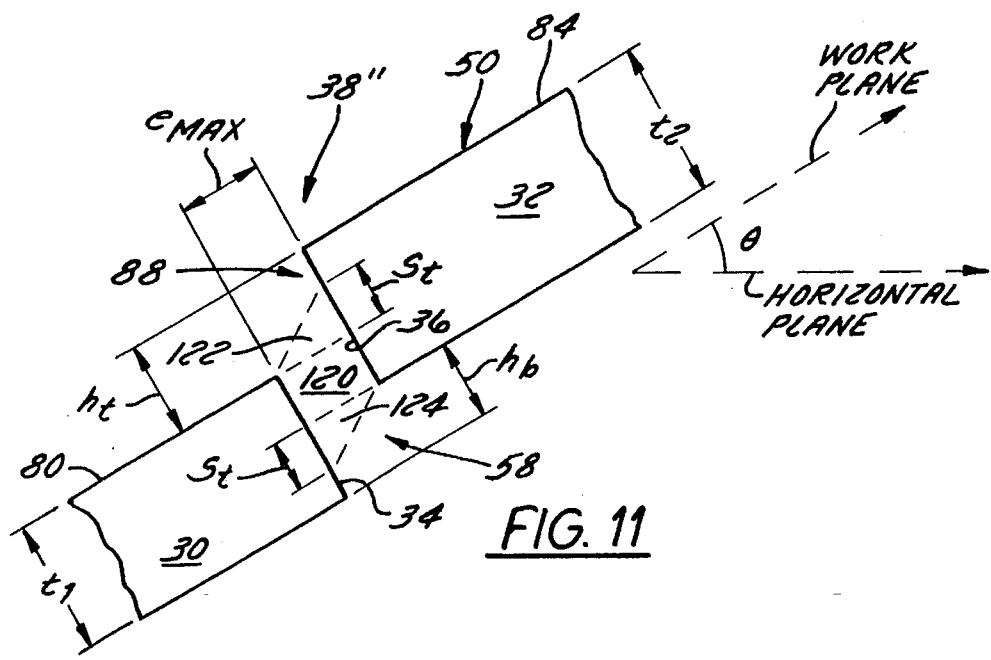
FIG. 11 is an enlarged fragmentary front view of the sheets depicted in FIG. 10 before welding illustrating more clearly the missing material desired to be provided during welding to fill joint fit-up gaps between the sheets.

FIGS. 10–12 illustrate a third butt joint configuration 38" where the pair of sheets 30 & 32 to be butt welded have the same cross-sectional thickness. As is shown in FIG. 10, the sheets 30 & 32 are positioned and oriented relative to each other such that surface mismatch, $h_t$, is introduced along the top bead side of the weld interface 58 for providing sufficient sheet material to be melted during welding to fill in joint fit-up gaps, e, between the sheets 30 & 32 and accommodate edge defects and other edge irregularities. Since the sheets 30 & 32 are of substantially the same cross-sectional thickness, such that $t_1 \approx t_2$, introducing surface mismatch, $h_t$ along the top bead side of the weld interface 58 also introduces surface mismatch, $h_b$, along the bottom root side of the weld interface 58 of the sheets 30 & 32.

As is also illustrated in FIG. 10, the sheets 30 & 32 are oriented and positioned relative to the high energy density radiation beam 40 such that due to surface mismatch, $h_t$, a portion of the edge of the mismatched sheet 50 is preferably exposed toward the beam 40 when welding is performed. The beam can impinge against the upper surface 86 of the mismatched sheet 50 with it being directed generally toward the weld interface such as the beam 40" shown in phantom in FIG. 10, with the exposed sheet edge portion 88 of the mismatched sheet 50 not being directly exposed toward the beam. Preferably, during welding, at least some portion of the beam 40 impinges against the exposed sheet edge portion 88 or the top surface 86 of the mismatched sheet 50 adjacent the exposed sheet edge portion 88 so that metal or sheet material from that region of the sheet 50 will be melted and flow into the weld interface 58 to fill in joint fit-up gaps between the sheets 30 & 32 and accommodate edge defects and the like.

Preferably, the amount of surface mismatch, $h_t$, introduced between the sheets 30 & 32 is selected to provide a sufficient amount or volume of metal or sheet material from at least a portion of the exposed sheet edge region 88 to adequately fill in joint fit-up gaps along the weld line 56 between the sheets 30 & 32. As is shown in FIG. 11, the missing material, MM, can be approximated by a rectangle 120 formed where the sheet edges 34 & 36 overlap and face each other, a triangle 122 having a leg, $s_t$, above the rectangle 120 and a triangle 124 having a leg, $s_b$, below the rectangle 120. The amount of missing material, MM, can be approximated by summing the surface areas of the rectangle 120 and triangles 122 & 124:

$$MM = e_{max} * (t_1 - h_t) + \tfrac{1}{2} e_{max} * s_t + \tfrac{1}{2} e_{max} * s_b$$

where:

$s_t \geq 0.1$ millimeters; and $s_b \geq 0.1$ millimeters.

As is illustrated in FIG. 12, when welding is completed, the resultant butt weld 44 joins the sheets 30 & 32 together. To provide good fatigue resistance to cyclical loading, high tensile strength, and high shear strength, the weld 44 joins the sheet edges 34 & 36 together completely across the weld interface 58 and from top to bottom along both sheet edges 34 & 36. To provide good torsion resistance, the butt weld 44 also preferably joins the sheets together completely along the weld interface 58 longitudinally along the weld line 56. Preferably, after welding is completed, the sheets 30 & 32 form a blank 46 that can be shaped, formed, or otherwise three dimensionally contoured.

Figure 13:
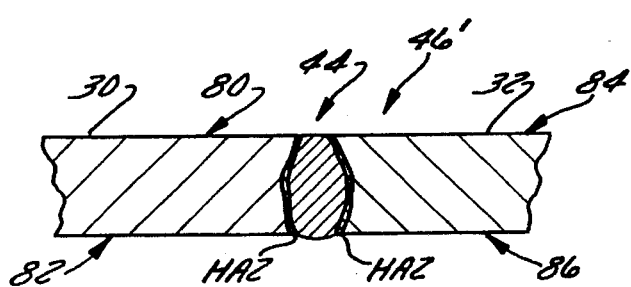
FIG. 13 is an enlarged fragmentary sectional view of the sheets after being hammered or rolled to eliminate surface mismatch between the sheets.

If it is desirable to reduce or eliminate surface mismatch between the sheets 30 & 32 after welding, a force, such as the force $F_h$ shown in FIG. 12 can be applied to the sheets 30 & 32 generally in the directions indicated in FIG. 12. To apply the force, $F_h$, to reduce or eliminate mismatch between the welded sheets 30 & 32, a relatively simple and gentle striking, hammering or rolling can be performed after welding, if desired by the end user. Preferably, at least one of the surfaces of one sheet will be substantially coplanar with one of the surfaces of the other sheet when mismatch reduction is completed. As is depicted in FIG. 13, when mismatch reduction is completed, the top surfaces 80 & 84 and bottom surfaces 82 & 86 of both sheets 30 & 32 are preferably coplanar or substantially coplanar for producing a welded blank 46' that is substantially flat. However, for sheets of different cross-sectional thickness, surface mismatch reduction preferably results in only one surface of one sheet being coplanar or substantially coplanar with one surface of the other sheet.

Preferably, surface mismatch reduction is performed shortly or nearly immediately after welding is completed such that at least some portion of the weld 44 is still malleable for reducing the amount of force, $F_h$, required. Alternatively, however, surface mismatch reduction can be performed after welding and after the weld fusion zone of the butt weld 44 has completely solidified.

Figure 14:
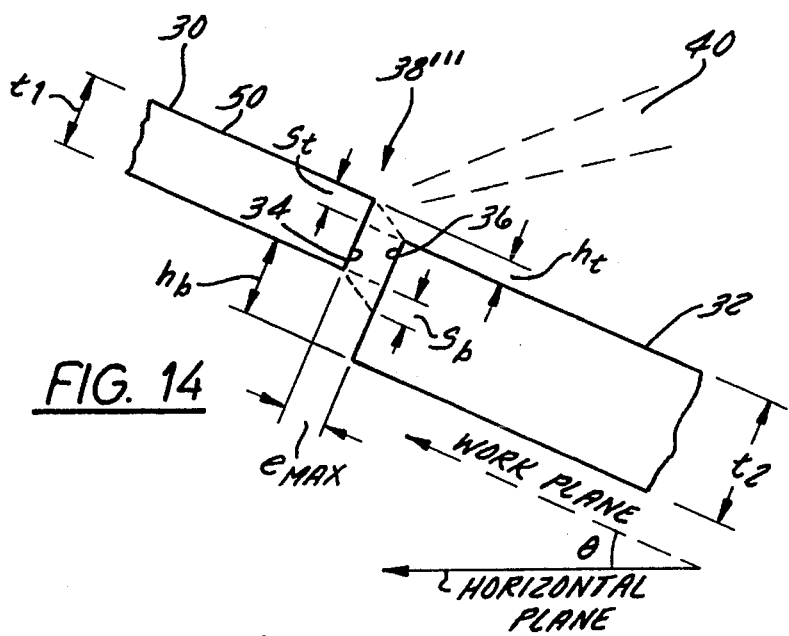
FIG. 14 is an enlarged fragmentary front view of a pair of sheets of dissimilar cross sectional thickness with the thinner sheet being the mismatched sheet and depicting in phantom the missing material desired to be provided during welding to fill joint fit-up gaps between the sheets.

FIG. 14 illustrates a fourth butt joint configuration 38''' having one sheet 30 thinner than the other sheet 32 with the thinner sheet 30 being the mismatched sheet 50 and having a portion of its sheet edge 34 exposed toward the high energy density radiation beam 40. Preferably, the missing material, MM, between the sheet edges 34 & 36 for this sheet and butt joint configuration can be approximated by:

$$MM = e_{max} * (t_1 - h_t) + \tfrac{1}{2} e_{max} * s_t + \tfrac{1}{2} e_{max} * s_b$$

EXAMPLE

Referring more particularly to FIGS. 7–9, the first sheet 30 has a cross-sectional thickness $t_1$ and the second sheet 32 has a cross-sectional thickness of $t_2$ and when the sheets 30 & 32 are positioned and oriented with their sheet edges 34 & 36 facing each other such that they are preferably abutting each other, there is a maximum joint fit-up gap, $e_{max}$, between the sheets 30 & 32 at some point along the weld line 56. The top surface 80 of the first sheet 30 is offset from the top surface 84 of the second sheet 32 for purposely introducing surface mismatch 48 between the sheets 30 & 32. Preferably, the top surfaces 80 & 84 of the sheets 30 & 32 are offset from each other to create a surface mismatch, $h_t$, at the top bead side of the weld interface 58 that has a distance equal to at least 10% of the cross-sectional thickness of the thinnest sheet, and preferably, $h_t$, is at least 0.1 millimeters.

Maximum Joint Fit-Up Gap Less Than 0.10 mm

Typically, the maximum joint fit-up gap, $e_{max}$, will be smaller for sheet edges subjected to some edge preparation before welding, such as by machining, milling or shearing the edges or where the edges were produced when the sheets were cut to size using a more refined cutting, slitting or blanking process, such as preferably fine blanking. In some instances, even industrial grade quality sheet edges may result in a butt-joint having a maximum joint fit-up gap, $e_{max}$, that is less than about 0.10 millimeters such as when the edges are relatively straight along the weld line formed where the edges abut each other.

For the case where the maximum joint fit-up gap, $e_{max}$, is small, preferably smaller than about 0.10 millimeters, preferably the amount of mismatch, $h_t$, introduced between the sheets 30 & 32 is at least about 0.10 millimeters. For pairs of sheets having a minimum sheet thickness less than about one millimeter, $h_t$ is preferably about 10% of the cross sectional thickness of the thinnest sheet of the pair.

Preferably, the angle of inclination, θ, of the sheets 30 & 32 transverse to the welding direction is between about 0° and 30°, preferably at least about 3°, and preferably is relatively small since the maximum joint fit-up gap is relatively small. If the sheets 30 & 32 are angled in the direction of welding, preferably the angle of inclination, α, is between about 0° and 30°. Preferably, α is at least about 3°.

Maximum Joint Fit-Up Gap Greater Than 0.10 mm

For the case where there is very little, poor, or even no edge preparation of the sheet edges such that $e_{max}$ is greater than about 0.10 millimeters, $h_t$, preferably is at least about:

$$h_t \geq 1.75 * e_{max}$$

To incline the sheets 30 & 32 such that the weld interface plane 60 is acutely angled relative to the direction of gravity, $F_g$, the sheets are preferably angled at angle, θ, relative to the horizontal plane 54 such that the following relationship is satisfied:

$$\tan \theta \geq (e_{max} \div h_t)$$

This means that for a chosen value of θ preferably within the range of 3° to 30°, $h_t$ is selected such that;

$$h_t \geq e_{max} \div \tan \theta$$

Alternatively, if $h_t$ is chosen such that it has a value greater than or equal to $1.75 * e_{max}$, θ is preferably selected such that;

$$\theta \geq \tan^{-1}(e_{max} \div h_t)$$

As such, $h_t$ is preferably selected or determined to provide enough surface mismatch between the surfaces 80 & 84 of the sheets 30 & 32 exposed toward the high energy density radiation beam 40 such that there will be enough sheet material from the exposed region 88 of the mismatched sheet 50 to at least help ensure that joint fit-up gaps, e, along the weld line 56 are adequately filled during welding. Preferably, the amount of surface mismatch, $h_t$, is preferably selected or determined based upon the maximum joint fit-up gap, $e_{max}$, between the sheets 30 & 32 so that the exposed region 88 of the mismatched sheet 50 provides a sufficient volume or amount of sheet material during welding to fill in joint fit-up gaps, e, along the weld line 56, even if there are joint fit-up gaps equal to the maximum joint fit-up gap, $e_{max}$.

The aforementioned cases are preferably intended to provide guidelines for selecting or determining the amount of surface mismatch, $h_t$, and angle of inclination, θ, and/or α and as such these guidelines not intended to limit the scope of the method of this invention. Preferably, $e_{max}$ can be determined based upon the type of cutting, slitting, or blanking process to cut the sheets 30 & 32 to size producing edges 34 & 36, as well as the amount and type of edge preparation performed on the sheet edges 34 & 36 before welding, if any edge preparation is performed at all.

Although, $e_{max}$ may be approximated based upon the type or nature of the cutting process or edge preparation, $e_{max}$ can also preferably be directly determined in a continuous welding environment using on-line fit-up gap measurement systems that preferably measure joint fit-up gap, e, along the weld line before welding is performed. This preferably enables process parameters such as welding speed, depth of beam focus, assist gas flow rate, and laser power to be adjusted for each pair of sheets to be welded based upon at least in part the maximum joint fit-up gap, $e_{max}$, measured. Preferably, using such an automated joint fit-up gap measurement system, also enables adjustment of the amount of surface mismatch, $h_t$, and the angle of inclination of the sheets relative to the direction of gravity, $F_g$, "on fly" and for each pair of sheets to be welded. As such, it is contemplated that the method of this invention is suited for use in such a continuous welding environment such as where sheets are uncoiled from coiled sheet stock, positioned and oriented to form a butt-joint in accordance with the method of this invention, and suitably welded with a minimum and preferably no edge preparation performed before welding.

Use and Operation

In use, the method of this invention is used to butt weld a pair of sheets 30 & 32 with one sheet positioned and oriented in close proximity to another sheet in a butt-joint arrangement 38 such that little or no edge preparation is required prior to welding. The method of this invention enables sheets 30 & 32 having edges with little or no edge preparation to be butt welded by introducing surface mismatch, $h_t$, between the sheets 30 & 32 so that joint fit-up gaps, e, along the weld line 56 of the abutted sheets 30 & 32 are adequately filled and sheet edge defects and irregularities are suitably accommodated. The butt welding method of this invention preferably utilizes a high energy density radiation beam 40, that preferably is a laser beam for producing a butt weld 44 joining the sheets 30 & 32 that possesses high strength and good integrity.

Preferably, the sheets 30 & 32 can be shaped or formed after welding. Preferably, the butt-welding method of this invention can be used to construct blanks 46 that can be shaped, formed, or otherwise three dimensionally contoured after welding is completed. The butt welding method of this invention does so economically by minimizing edge preparation of the sheet edges before welding. Preferably, no edge preparation is required and the sheet edges can be welded in the as-cut, as-slit, or as-blanked condition.

In operation, a pair of sheets 30 & 32 are positioned and oriented relative to each other such that at least a portion of their edges 34 & 36 face each other to form a butt-joint arrangement 38. Preferably, at least a portion of the sheet edges 34 & 36 abut each other at some point along the weld line 56 where the sheet edges 34 & 36 face each other. To provide sheet material during welding to fill in joint fit-up gaps, e, along the weld line 56 as well as to accommodate edge defects and irregularities, surface mismatch 48 is introduced between the sheets 30 & 32. To facilitate flow of molten sheet material from the exposed region 88 of the mismatched sheet 50, the sheets 30 & 32 are preferably positioned and oriented such that the sheets 30 & 32 are inclined at an angle, $\theta$, relative to the horizontal plane 54 so that the plane 60 of the weld interface 58 where the sheet edges face each other is acutely angled relative to the direction of gravity, $F_g$. To minimize concavities in the butt weld 44 produced using the method of this invention, the sheets 30 & 32 are preferably positioned and oriented such that their work plane is acutely angled at an angle, $\alpha$, relative to the horizontal plane 54 and is downwardly sloped in the direction of welding.

Preferably, the amount of surface mismatch, $h_t$, introduced is dependent upon the maximum joint fit-up gap, $e_{max}$, between the sheet edges 34 & 36. If desired, $e_{max}$ can be measured for each pair of sheets to be butt-welded as part of the process of selecting or determining the amount of surface mismatch desired, $h_t$. Alternatively, $e_{max}$ may be approximated based upon the type of cutting, slitting, or blanking operation performed on the sheets 30 & 32 before welding, as well as the amount and nature of any edge preparation performed on the sheet edges 34 & 36 before welding. Approximate values of $e_{max}$ for the type of cutting process or edge preparation performed may be based on empirical data relating to the type of cutting, slitting or blanking processing used as well as the type and nature of edge preparation, if any is performed before welding.

Preferably, the sheet surfaces are offset from each other to create sufficient mismatch 48 between the sheets 30 & 32 such that sufficient additional sheet material is available during welding to fill in joint fit-up gaps, e, along the weld line 56 even if the sheet edges 34 & 36 are spaced apart along the entire weld line 56 by the amount of the maximum joint fit-up gap, $e_{max}$. For the case where $e_{max}$ is less than 0.10 mm, for example, such as if the sheet edges were produced by fine blanking, $h_t$ is preferably greater than or equal to about 0.10 mm. For the case where $e_{max}$ is greater than 0.10 mm, such as where sheets having industrial grade quality sheet edges are used, $h_t$ is preferably greater than or equal to $1.75 * e_{max}$.

To facilitate flow of recited sheet material from the mismatched sheet 50 into the weld interface 58 region during welding, the weld interface plane 60 is acutely angled relative to the direction of gravity, $F_g$. Preferably, to acutely angle the weld interface plane 60, the angle of orientation, $\theta$, of the sheets 30 & 32 relative to the horizontal plane 54 is at least 3° and preferably no greater than about 30°. If $e_{max}$ is particularly large or when welding certain sheet materials, $\theta$, may be outside of this range.

Preferably, the sheets 30 & 32 can be angled relative to the horizontal plane 54 such that the weld line 56 is at least slightly downwardly sloped so that the direction of gravity, $F_g$, will influence at least one of the formation, geometry, and/or flow of molten sheet material in the region of the weld interface 58 and generally in the direction of welding. Preferably, the downward slope of the sheets 30 & 32 acutely inclines the weld line 56 relative to the horizontal plane 54 at an angle of at least about 3° and preferably within the range of between 0° and 30°.

Preferably, after welding is completed, the resultant butt weld 44 bridges the sheets 30 & 32 extending completely across the weld interface 58 and possesses good tensile and shear strengths, resistance to torsion, fatigue resistance and good integrity. Preferably, after welding is completed, the sheets 30 & 32 form a blank 46 that can be formed using conventional shaping or forming methods.

It is also to be understood that, although the foregoing description and drawings describe and illustrate in detail working embodiments of the present invention, to those skilled in the art to which the present invention relates, the present disclosure will suggest many modifications and constructions as well as widely different embodiments and applications without thereby departing from the spirit and scope of the invention. The present invention, therefore, is intended to be limited only by the scope of the appended claims and the applicable prior art.

What is claimed is:

1. A method of welding using a high energy density radiation beam comprising:

(a) providing a pair of sheets with top and bottom surfaces and having sheet edges to be welded together and a high energy density radiation beam source capable of generating a high energy density radiation beam and focusing the beam onto at least one of the sheets;

(b) positioning one sheet in close proximity to the other sheet with their sheet edges adjacent to and facing each other in a butt-joint arrangement, defining a work plane generally tangent to one of the top surfaces of one of the sheets, and their top surfaces exposed toward the high energy density radiation source;

(c) orienting the sheets such that the workplane is acutely angled relative to a horizontal plane that is generally perpendicular to the direction of the local gravity;

(d) mismatching one of the sheets relative to the other of the sheets by offsetting a top surface of one sheet relative to a top surface of the other sheet such that the top surfaces of the sheets are not substantially coplanar and having an amount of mismatch between the mismatched sheet and the other sheet of at least about 10% of the cross sectional thickness of the thinnest sheet; and (e) training at least a portion of a high energy density radiation beam onto the mismatched sheet for joining the sheets together by a butt-weld such that molten sheet material from the mismatched sheet fills in a joint fit-up gap between the sheet edges.

2. The method of claim 1 wherein the high energy density beam source is a laser that produces a high energy density radiation beam that is a laser beam for butt welding the sheets together.

3. The method of claim 1 wherein a portion of an edge of the mismatched sheet is exposed toward the high energy density radiation beam and during step (e) at least a portion of the high energy density radiation beam irradiates the exposed sheet edge for melting sheet material from the mismatched sheet to fill in joint fit-up gaps between the sheet edges during welding.

4. The method of claim 3 wherein the top surface of the mismatched sheet adjacent the exposed edge is exposed toward the high energy density radiation beam and during step (e) at least a portion of the high energy density radiation beam irradiates the exposed surface of the mismatched sheet adjacent the exposed sheet edge for melting sheet material of the mismatched sheet to fill in joint fit-up gaps between the sheet edges during welding.

5. The method of claim 1 wherein during step (d) the amount of mismatch between the mismatched sheet and the other sheet is at least about 0.10 mm for providing sufficient sheet material from the mismatched sheet to be melted during welding to fill joint fit-up gaps between the sheet edges.

6. The method of claim 1 wherein there is a joint fit-up gap between the sheet edges and during step (d) the amount of mismatch between the mismatched sheet and the other sheet is equal to about the maximum joint fit-up gap between the sheet edges multiplied by the coefficient 1.75 for providing sufficient sheet material to be melted during welding to fill joint fit-up gaps between the sheet edges.

7. The method of claim 1 wherein before step (e), the further step comprising determining the maximum joint fit-up gap between the sheet edges.

8. The method of claim 1 wherein the sheets form a work plane generally parallel to a surface of one of the sheets that is oriented at an acute angle, θ, relative to a horizontal plane that is generally perpendicular to the direction of the local gravity such that the trigonometric tangent of the angle of inclination, θ, of the work plane of the sheets relative to the horizontal plane is equal to or greater than about the result of the maximum joint fit-up gap along the sheet edges divided by the amount of mismatch between the sheets.

9. The method of claim 8 wherein the positioning and orientation of the sheets and the amount of mismatch between the sheets satisfies:

$$\tan \theta \geq (e_{max} \div h_t)$$

where (1) θ is the angle of the work plane of the sheets relative to the horizontal plane; (2) $e_{max}$ is the maximum joint fit-up gap between the sheet edges; and (3) $h_t$ is the amount of mismatch between the sheets.

10. The method of claim 9 wherein the positioning and orientation of the sheets and the amount of mismatch between the sheets satisfies:

$$\tan \theta \geq (e_{max} \div h_t)$$

where (1) θ is the angle of the work plane of the sheets relative to the horizontal plane transverse to the direction of welding and is no greater than about 45°; (2) $e_{max}$ is the maximum joint fit-up gap between the sheet edges and is greater than about 0.1 millimeters; and (3) $h_t$ is the amount of mismatch between the sheets and is at least about 0.1 millimeters.

11. The method of claim 1 wherein at least one of the sheets is acutely angled at an angle of at least about 3° relative to the horizontal plane.

12. The method of claim 11 wherein at least one of the sheets is acutely angled at an angle of no greater than about 45° relative to the horizontal plane.

13. The method of claim 11 wherein at least one of the sheets is acutely angled at an angle of no greater than about 30° relative to the horizontal plane.

14. The method of claim 1 wherein a weld line along the sheet edges is defined where the sheet edges face each other and when positioned in a butt-joint relationship the step further comprising positioning and orienting the sheets relative to the direction of gravity so that the weld line is downwardly sloped relative to the direction of gravity and in the direction of welding for enabling the direction of gravity to influence a molten weld nugget formed during welding in the weld interface region between the sheet edges to minimize concavity in the butt weld joining the sheets together after welding is completed.

15. The method of claim 1 wherein at least one of the sheets is constructed of steel, aluminum, nickel, copper or another metal.

16. The method of claim 1 wherein at least one of the sheet edges of the sheets to be welded is of industrial edge quality and not edge prepared before welding.

17. The method of claim 2 wherein the laser beam has a focused beam spot of oblong shape having its longitudinal axis generally perpendicular to the direction of welding.

18. The method of claim 1 wherein the high energy density radiation beam has a focused beam spot that is oscillated back and forth in a direction generally tangent to the welding direction.

19. The method of claim 1 further comprising the step of forming or shaping the sheets after welding is completed.

20. The method of claim 1 further comprising the step of subjecting the sheets to a striking, hammering or rolling operation during or after step (d) so that there is virtually no mismatch between at least one surface of one sheet and another surface of the other sheet so that the sheet surfaces are substantially coplanar.

21. The method of claim 1 wherein the mismatched sheet has a portion of a sheet edge exposed to the high energy density radiation beam.

22. The method of claim 19 wherein, during or after step (d), further comprising the step of forming or shaping at least one of the sheets using one of the following methods of forming: drawing, deep drawing, hydro-forming, or roll forming.

23. The method of claim 22 wherein (1) the sheets define a weld line where their sheet edges face toward each other, and (2) at least one of the sheets and a portion of the weld line are bent or three dimensionally contoured during forming or shaping.

24. The method of claim 23 wherein a portion of the weld is bent or three dimensionally contoured during forming or shaping.

25. The method of claim 1 wherein one of sheets has at least one mechanical or metallurgical property that is different than the other of the sheets.

26. The method of claim 1 wherein (1) the sheets define a weld line where their sheet edges face toward each other, (2) there is at least one fit up gap between the sheet edges where the sheet edges do not abut each other along the weld line, (3) the abutted sheets have a maximum joint fit-up gap along the weld line where the gap between the sheet edges is a maximum, and (4) the maximum joint fit-up gap is at least 0.1 millimeter.

27. The method of claim 26 wherein the maximum joint fit up gap is at least about 0.2 millimeter.

28. The method of claim 26 wherein the maximum joint fit up gap is no greater than about 10% of the thickness of the sheet having the greatest cross sectional thickness.

29. The method of claim 1 wherein both sheets have the same cross sectional thickness.

30. The method of claim 1 wherein both sheets have a cross sectional thickness of at least 0.5 millimeter.

31. The method of claim 30 wherein both sheets have a cross sectional thickness of at least one millimeter.

32. The method of claim 30 wherein both sheets have a cross sectional thickness of no greater than about five millimeters.

33. A method of welding using a high energy density radiation beam comprising:
  (a) providing a pair of sheets having top surfaces and sheet edges to be welded together, and a high energy density radiation beam source capable of generating and focusing a high energy density radiation beam onto at least one of the sheets;
  (b) positioning one sheet in close proximity to the other sheet with their sheet edges generally facing toward each other forming a butt-joint arrangement having (1) a joint fit-up gap between the sheet edges, (2) defining a weld line between the sheet edges, and (3) having at least one of their top surfaces generally exposed toward the high energy density radiation source;
  (c) mismatching one of the sheets relative to the other of the sheets by offsetting a top surface of one sheet relative to a top surface of the other sheet such that the top surfaces of the sheets are not substantially coplanar;
  (d) orienting at least one of the sheets such that the sheets form a work plane generally tangent to a top surface of one of the sheets which is oriented at an acute angle relative to a horizontal plane that is generally perpendicular to the direction of the local gravity such that the trigonometric tangent of the angle of inclination of the work plane relative to the horizontal plane is equal to or greater than about the result of the maximum joint fit-up gap along the weld line divided by the amount of mismatch between the sheets; and
  (e) training at least a portion of a high energy density radiation beam onto the mismatched sheet for joining the sheets together.

34. The method of claim 33 wherein molten sheet material from adjacent the sheet edge of the mismatched sheet flows toward the other sheet to fill in joint fit-up gaps along the weld line.

35. The method of claim 33 wherein the positioning and orientation of the sheets and the amount of mismatch between the sheets satisfies:

$$\tan \theta \geq (e_{max} \div h_t)$$

where (1) $\theta$ is the angle of the work plane of the sheets relative to the horizontal plane transverse to the direction of welding and is no greater than about 45°; (2) $e_{max}$ is the maximum joint fit-up gap between the sheet edges and is greater than about 0.1 millimeters; and (3) $h_t$ is the amount of mismatch between the sheets and is at least about 0.1 millimeter.

36. The method of claim 35 wherein a portion of an edge of the mismatched sheet is exposed toward the high energy density radiation beam and during step (d) at least a portion of the high energy density radiation beam irradiates the exposed sheet edge.

37. The method of claim 33 wherein, during or after welding, further comprising the step of forming or shaping at least one of the sheets using one of the following methods of forming: drawing, deep drawing, hydro-forming, or roll forming.

38. The method of claim 37 wherein both of the sheets have a cross sectional thickness that falls within the range of between about 0.5 millimeter and about five millimeters.

39. The method of claim 38 wherein (1) the sheets define a weld line where their sheet edges face toward each other, and (2) at least one of the sheets and a portion of the weld line are bent or three dimensionally contoured during forming or shaping.

40. The method of claim 39 wherein a portion of the weld is bent or three dimensionally contoured during forming or shaping.

41. The method of claim 33 wherein the amount of mismatch between the mismatched sheet and the other sheet is at least 0.10 millimeter.

42. The method of claim 41 wherein there is at least one joint fit-up gap between the sheets of at least about 0.05 millimeter.

43. The method of claim 33 wherein the maximum joint fit up gap is no greater than about 10% of the thickness of the sheet having the greatest cross sectional thickness.

44. The method of claim 33 wherein the sheets are oriented during welding such that the work plane is acutely angled relative to the horizontal plane at an angle of between about 3° and 45°.

45. A method of welding using a high energy density radiation beam comprising:
  (a) providing a first sheet having a sheet edge and a top and bottom surface and a second sheet having a sheet edge and a top and bottom surface;
  (b) placing one of the sheets in close proximity to the other of the sheets so that their sheet edges generally face each other (1) forming a butt-joint, (2) defining a weld line, (3) defining a weld interface having a plane generally tangent to the shear plane of at least one of the sheet edges, and (4) having a maximum gap, $e_{max}$, between the edges along the weld line, with the sheets defining a work plane that is generally tangent to a surface of one of the sheets
  (c) offsetting the top surface of one of the sheets relative to the top surface of the other of the sheets to introduce mismatch, $h_t$, between the sheets such that the top surfaces of the sheets are not coplanar along the weld line, with the amount of mismatch, $h_t$, being at least about 0.1 millimeter;
  (d) orienting the sheets such that the work plane is angled generally transverse to the direction of welding at an acute angle, $\theta$, relative to a horizontal plane generally perpendicular to the direction of the local gravity so that during welding molten sheet material from the mismatched sheet flows toward the butt joint to help fill joint fit-up gaps between the sheet edges; and
  (e) training a high energy density radiation beam onto at least one of the sheets along the weld line to weld the sheets together.

46. The method of claim 45 wherein the beam impinges against the top surface of both sheets.

47. The method of claim 45 wherein the amount of mismatch, $h_t$, is at least 10% of the cross sectional thickness of the thinnest sheet.

48. The method of claim 45 wherein the $\tan(\theta) \geq (e_{max} \div h_t)$ where $h_t$ and $e_{max}$ are expressed in millimeters and $e_{max} \geq 0.1$ millimeter.

49. The method of claim 45 wherein the $\tan(\theta) \geq (0.1 \div h_t)$ where $h_t$ is expressed in millimeters.

50. The method of claim 45 wherein $\theta \geq 3°$.

51. The method of claim 45 wherein $\theta \leq 45°$.

52. The method of claim 45 further comprising the step of forming or shaping the welded sheets.

* * * * *